United States Patent [19]
Pelegri-Llopart et al.

[11] Patent Number: 5,999,988
[45] Date of Patent: Dec. 7, 1999

[54] METHOD AND APPARATUS FOR GENERATING AND EMPLOYING A RUN-TIME GENERATED STUB TO REFERENCE AN OBJECT IN OBJECT ORIENTED SYSTEMS

[75] Inventors: Eduardo Pelegri-Llopart, Mountain View; Graham Hamilton; Peter B. Kessler, both of Palo Alto, all of Calif.; James H. Waldo, Dracut, Mass.; Roger Riggs, Burlington; Ann M. Wollrath, Groton, both of Mass.

[73] Assignee: Sun Microsystems, Inc., Mountain View, Calif.

[21] Appl. No.: 08/829,861

[22] Filed: Mar. 31, 1997

[51] Int. Cl.$^6$ ................................................. G06F 9/46
[52] U.S. Cl. .................................. 709/304; 709/1
[58] Field of Search .......................... 395/680, 684, 395/406; 711/6; 709/1, 300, 304

[56] References Cited

U.S. PATENT DOCUMENTS

| | | | |
|---|---|---|---|
| 5,511,197 | 4/1996 | Hill et al. | 709/303 |
| 5,577,251 | 11/1996 | Hamilton et al. | 709/101 |
| 5,684,955 | 11/1997 | Meyer et al. | 395/200.03 |
| 5,737,607 | 4/1998 | Hamilton et al. | 395/701 |
| 5,758,186 | 5/1998 | Hamilton et al. | 395/831 |
| 5,787,251 | 7/1998 | Hamilton et al. | 395/200.33 |
| 5,809,507 | 9/1998 | Cavanaugh, III | 707/103 |
| 5,860,004 | 1/1999 | Fowlow et al. | 395/701 |

FOREIGN PATENT DOCUMENTS

| | | | |
|---|---|---|---|
| 0 546 684 | 11/1992 | European Pat. Off. | G06F 9/44 |
| 0 643 349 | 8/1994 | European Pat. Off. | G06F 9/46 |

OTHER PUBLICATIONS

Glenn Krasner *The Smalltalk–80 Virtual Machine* Learning Research Group; Xerox Palo Alto Research Group pp. 300–320.

Kessler P B: "A Client–Side Stub Interpreter", ACM Sigplan Notices, vol. 29, No. 8, Aug. 1, 1994, pp. 94–100.

Hamilton et al., "Subcontract: A flexible base for distributed programming" Proceedings of 14th ACM Symposium on Operating Systems Principles, pp(11), Nov. 1993.

Kougiouris et al., "Support for Space Efficient Object Invocation in Spring" In "A Spring Collection", Sunsoft Inc., pp(14), Sep. 1994.

*Primary Examiner*—Alvin E. Oberley
*Assistant Examiner*—St. John Courtenay, III
*Attorney, Agent, or Firm*—Blakely Sokoloff Taylor & Zafman

[57] ABSTRACT

The method and apparatus for generating and employing a run-time generated stub to reference an object in an object oriented system. This method and apparatus represents in a first virtual machine a remote object implemented in a second virtual machine by employing a stub class. An object reference is sent by the second virtual machine and received by the first virtual machine. The object reference includes an interface descriptor that identifies the interface(s) of the remote object and an object handle that identifies the remote object. At run-time, the information associated with the remote object is transformed into a stub class that represents the remote object and implements only those interfaces identified by the interface descriptor and also defined by the first virtual machine. After the stub class is created, an instance of that stub class is generated and provided to the first virtual machine. In an alternative embodiment, an interface specific stub is created for each interface that is identified by the interface descriptor and defined by the first virtual machine. The interface specific stub is created at compile time. A delegator stub class is created at run-time that delegates to the interface specific stub(s).

28 Claims, 19 Drawing Sheets

METHOD AND APPARATUS FOR GENERATING AND EMPLOYING A RUN-TIME GENERATED STUB TO REFERENCE AN OBJECT IN OBJECT ORIENTED SYSTEMS

BACKGROUND OF THE INVENTION

1. Field of the Invention

The present invention relates to the fields of distributed computer systems, client-server computing, and object oriented programming. Specifically, the present invention relates to a method and apparatus for clients on different machines to communicate references to remote objects such that the receiving machine has as much information as wanted, neither more nor less, of the type of the remote object.

2. Background

In client-server computing, typically there is a set of computers that can communicate with one another through a network connecting the computers. A first computer in the network that is referred to as a client sends a request to a second computer in the network that is referred to as a server. In response to the request, the server takes action and generally provides data representing the results of the action to the client. The client-server model also generalizes to the case where distinct processes, running on the same computer, are communicating with one another through some protected mechanism and are acting as server and clients.

For examples of client-server systems see: (i) J. K. Ousterhout et al, "Medusa: An Experiment in Distributed Operating System Structure", Communications of the ACM 23(2),1980; (ii) R. M. Needham and A. J. Herbert, "The Cambridge Distributed Computing System", Addison-Wesley, 1982; and (iii) J. K. Ousterhout et al "The Sprite Distributed Operating System", IEEE Computer, 1988.

Object-oriented programs have proven very useful in the design and implementation of computer systems. Object oriented systems are known, but are described briefly here for completeness. In an object-oriented environment, computer instructions represent objects which have a state and a behavior. Components of the state of an object and the behavior of the object are defined by a class to which the object belongs. A class defines a number of attributes and member functions of the object which belong to the class. An attribute is a component of the state of an object and the value of an attribute can vary from one object of a class to another object of the class. For example, a class of tables can define a color attribute. Each object of the class of tables has a color attribute, but the value of the color attribute of one table can specify the color red while the value of the color attribute of another table can specify the color green. A member function is a collection of computer instructions and data which collectively define a task which can be performed by an object. For example, a table can be asked to bear a weight, and the behavior of the table in bearing the weight is defined by the member function provided by the table class for bearing a weight. In addition, the member function provided by the table class is performed in the context of the state of the particular table which is bearing the weight. For example, the state of a table can include various dimensions of the table, the materials from which the table is made, and the amount of weight already supported by the table. The specific behavior of the table in bearing the weight can include, for example, changes in the state of the table including adding the weight to the amount of weight already supported by the table or breaking under the additional weight.

A particularly helpful feature of object-oriented environments is generally referred to as inheritance. Inheritance refers to inheritance of attributes and member functions of one class from another class according to a class hierarchy. Each class can have one or more subclasses, each of which can add attributes and/or member functions and can redefine member functions. For example, a desk class is a subclass of the table class and defines an additional attribute which specifies the number of drawers of the desk. Thus, in addition to an attribute which defines the number of drawers of the desk, a desk inherits from the table class the color attribute and the attributes specifying various dimensions of the desk. Furthermore, a desk can perform the weight bearing member function described above and the behavior of the desk in performing the weight bearing member function is defined by the table class. The desk class can define additional member functions not defined by the table class, e.g., an open drawer member function, a place object in drawer member function, a remove object from drawer member function, and a close drawer member function. As described above, a subclass can also redefine an inherited member function, thereby superseding the inherited definition of the member function. For example, the table class can have a subclass which is a folding table class. The weight bearing member function described above can be redefined by the folding table class such that a folding table asked to bear a weight is verified to be in an unfolded, upright position prior to bearing any weight.

A member function defined by a class is performed by directing an object of the class to perform the member function. The particular member function performed is selected according to the class to which the object belongs. If the class to which the object belongs does not define such a member function, the member function is selected from the superclass which defines the member function and for which no subclass defines the member function. A first class is a superclass of a second class if the second class is a subclass of the first class. The member function is performed in the context of the state of the object directed to perform the member function. As described above, the particular behavior of a table which is directed to perform the weight bearing member function described above depends on the state of the table, including the particular dimensions of the table, the materials from which the table is made, and the amount of weight already supported by the table. For further description of object-oriented design and programming techniques, see B. Meyer, "Object-Oriented Software Construction", (Prentice-Hall, 1988).

In a distributed object-oriented computer system, clients are typically given object handles to reference remote objects. A remote object is an object whose class is implemented on a process that is different from the process where the object handle resides. Often, a remote object is implemented on a machine (hereinafter known as a remote machine) that is remote from the machine (hereinafter known as the local machine) where the object handle resides. The object handle identifies a remote object and enables invocation of the member functions of the remote object by the client. If a given client has an object handle referencing a particular remote object, then that client can pass a copy of that object handle to another client. The second client can then use the object handle to access the remote object and to invoke member functions of the remote object. Stub objects are typically employed in a local machine to reference a remote object whose class is implemented on a machine that is remote from the local machine.

For further description of object-oriented distributed systems, see (i) E. D. Lazowska et al "The Eden System: A Technical Review", IEEE Transactions on Software Engineering SE-11(1), January 1985; (ii) Jul et al "Fine Grained Mobility in the Emerald System", ACM Transactions on Computer Systems, 6(1), 1988; and (iii) B Liskov, "Distributed Programming in Argus", Communications of the ACM, 31(3), 1988.

Another helpful feature of object-oriented environments is referred to as interfaces. An interface is a collection of member function definitions without implementation. A programmer can employ interfaces to specify the member functions an object can perform. An interface defines the inputs, outputs, attributes, and exceptions of the member functions without the implementation. Implementations of a member function are the computer instructions that are executed by the computer to perform the member functions. While an interface specifies the inputs, outputs, attributes and exceptions of a member function, the interface does not include any computer instructions (i.e., the implementation of the member function). An object can have one or more interfaces. A class that specifies an interface typically includes implementation to perform all the member functions of the interface.

When the remote object includes multiple interfaces, a problem arises as to what extent the stub object on the local machine describes the interfaces of the remote object. Prior art systems address this problem using one of the following approaches.

In a first approach, the stub class in the local machine defines only the interface of the remote object that is explicitly requested prior to invoking a member function of that particular interface on the local machine. At any given time, the stub class (hereinafter referred to as the interface-specific stub class) only implements one of the interfaces of the remote object denoted by the stub. One disadvantage of this first approach is that any object instantiated from this stub class inaccurately responds to queries as to interface type on interface different to the one specifically requested.

A software language construct can be employed to query an object as to the object's interfaces (also referred to as interface type). For example, in JAVA the command instanceof (obj) yields a true or false to indicate whether the object includes the specified interface. Since, in this approach, the stub object does not accurately define all the interfaces of the remote object, these interface type queries cannot be used with confidence. For example, the stub object on the local machine can indicate that a particular interface is not included in a remote object where, in fact, the remote object includes that interface.

In a second approach, the stub class, associated with the remote object, defines and implements all the interfaces of the remote object. Although an object instantiated from this stub class will respond correctly to inquiries as to interface type, this approach requires the exporting of interfaces from the remote machine to the local machine, even for interfaces that are never used in the local machine. Moreover, this approach is inefficient and also opens security issues that need to be addressed.

For example, let us consider a remote object including three interfaces (interface A, interface B, and interface C). Interface A defines member functions X, Y and Z; interface C defines member functions Q, R and S, and interface B defines member function P. If any one of the member functions X, Y, Z, Q, R, S, or P are to be invoked on the local machine, a stub class is created that implements interfaces A, B and C regardless of whether member functions of those interfaces are ever invoked on the local machine.

An important and heretofore unsolved problem in distributed object oriented systems described using a language with a strong type system, is how to represent an object handle of a remote object so as to take advantage of the strong type system in the client machine and so as to ensure the object handle correctly identifies all interfaces of a remote object that are supported by the virtual machine on which the client application resides without having to export unnecessary implementation of interfaces not used by the local machine.

SUMMARY OF THE INVENTION

In accordance with the teachings of the present invention, a stub class is employed to represent in a first virtual machine a remote object implemented in a second virtual machine. The first virtual machine receives a reference to the remote object. This reference includes information associated with the remote object and also includes a list of interfaces of the remote object. The information associated with the remote object can include information to uniquely identify a location where the implementation of the remote object resides. After receiving the reference to the remote object, the stub class generator, in accordance with the present invention, transforms at run-time the information associated with the remote object into a stub class that represents the remote object in the first virtual machine and implements in the first virtual machine only those interfaces on the list of interfaces that are also supported by the first virtual machine.

The stub class is generated from the information associated with the remote object by comparing the list of interfaces, included in the reference, with those interfaces defined in the first virtual machine. The stub class generator generates a common interface list that includes those interfaces that are on the list of interfaces and are also supported by the first virtual machine. The stub class generator also generates a list of member functions (herein referred to as a member function list) supported by the common interface list. The stub class is generated from the common interface list, the member function list, and the information associated with the remote object received from the second virtual machine. Objects of this stub class are employed by a process to invoke member functions of the remote object. Also, objects of this stub class can be queried by a programming language construct to determine the object's type or interface. Since not all interfaces of a remote object are defined by the local virtual machine, objects of this stub class accurately reflect the type or interfaces of the remote object and respond accordingly to queries as to type or interfaces without unnecessarily providing definitions for interfaces that were not initially defined by the local machine.

In an alternate embodiment of the present invention, a delegator stub class and at least one interface specific stub class are created and employed to represent the remote object. The delegator stub class generator creates the delegator stub class at run-time based on the common interface list, the member function list, and the information associated with the remote object. An interface specific stub generator generates at compile time at least one interface specific stub class based on the remote interfaces known to the local process. In this embodiment, the delegator stub class invokes a member function defined by the interface-specific stub class corresponding to the member function requested (i.e., delegates to the appropriate interface specific stub). Objects of this delegator class are employed by a process to invoke member functions of the remote object. Also, objects of this delegator class can be queried by a programming language construct to determine the object's type or interface. Objects of this delegator class accurately reflect the type or interfaces of the remote object and respond accordingly to queries as to type or interfaces without unnecessarily implementing those member functions that are not defined by the local machine.

BRIEF DESCRIPTION OF THE DRAWINGS

The objects, features and advantages of the system of the present invention will be apparent from the following description in which.

DETAILED DESCRIPTION OF THE INVENTION

Description of the Invention:

A method and apparatus for representing in a first virtual machine a remote object, implemented in a second virtual machine, by employing a run-time stub or a run-time delegator stub are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

An embodiment of the present invention employs an object reference having an interface descriptor (e.g., a list) of the interfaces supported by the implementation of the remote object. This interface descriptor is sent together with other object reference information including an object handle to the first virtual machine. The object reference is passed from one virtual machine to another. The present invention describes interfaces in the following ways.

Describing an Interface

One way to describe an interface is by just giving its name. This requires or assumes that the name of the interface is enough to uniquely identify it.

An alternative mechanism is the technique described in the patent application titled, "System and Method for Generating Identifiers for Uniquely Identifying Object Types Used in Processing of Object-Oriented Programs and the Like", invented by James H. Waldo, Krishna Bharat and Roger Riggs, and assigned to the assignee of the present application. In this mechanism, the name of the class and a fingerprint of it are used. The fingerprint assures (with confidence depending on the size of the fingerprint) that the sending and receiving machines have the same definitions for the interface they are referring.

Overview of the Present Invention

An embodiment of the present invention employs the list of interfaces to generate an object whose type is as close as possible to that of the original remote object, but the object does not require any additional types external to the receiving machine. The generation of this object relies on the ability to construct, at run-time a new stub class embodying the object handle, and on the ability to instantiate such a class. Two embodiments of the present invention are illustrated in FIGS. 1 and 2.

Figure 1:
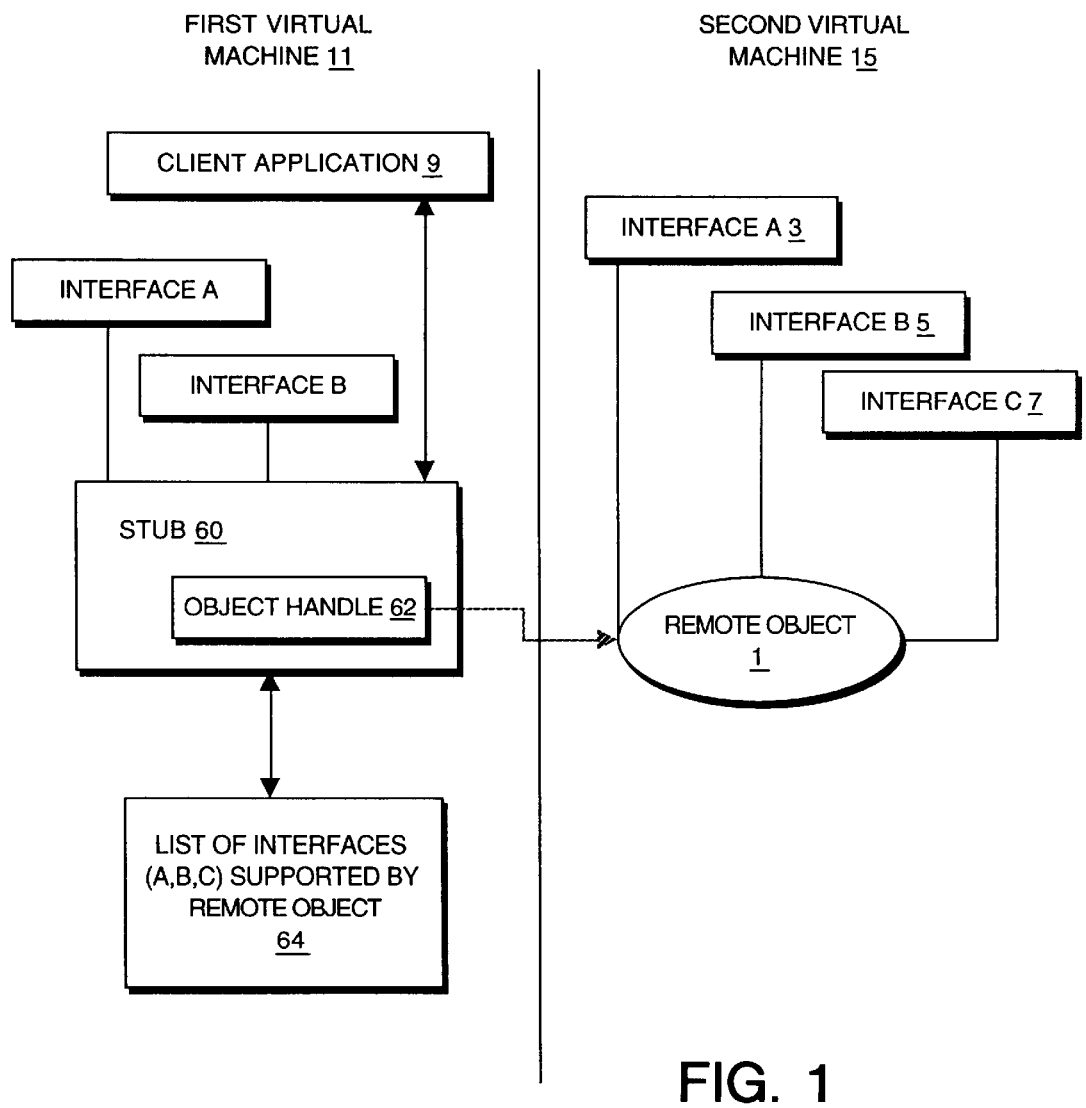
FIG. 1 illustrates one embodiment of the present invention which employs a run-time stub to represent in a first virtual machine an object implemented in a second virtual machine.

FIG. 1 illustrates one embodiment of the present invention which employs a run-time stub to represent in a first virtual machine 11 (hereinafter referred to as a local machine) an object 1 implemented in a second virtual machine 15 (hereinafter also referred to as a remote machine). A virtual machine is simply a collection of objects and associated execution threads that associate and operate on those objects. In other operating systems, the terms "process" or "address space" would be used in place of the term "virtual machine" (e.g., in the UNIX operating system). The run-time stub 60 of the present invention represents the remote object 1 that is implemented with interface A 3, interface B 5 and interface C 7. The remote object 1 is implemented in a second virtual machine 15. The run-time stub 60 of the present invention is coupled to a client application 9 and also to an interface descriptor 64 which can be a list of interfaces supported by the remote object 1. As noted in FIG. 1, the run-time stub 60 of the present invention implements only those interfaces (i.e., interface A and interface B) that are supported by the first virtual machine 11. The run-time stub 60 of the present invention includes an object handle 62 that is associated with the remote object 1.

Figure 2:
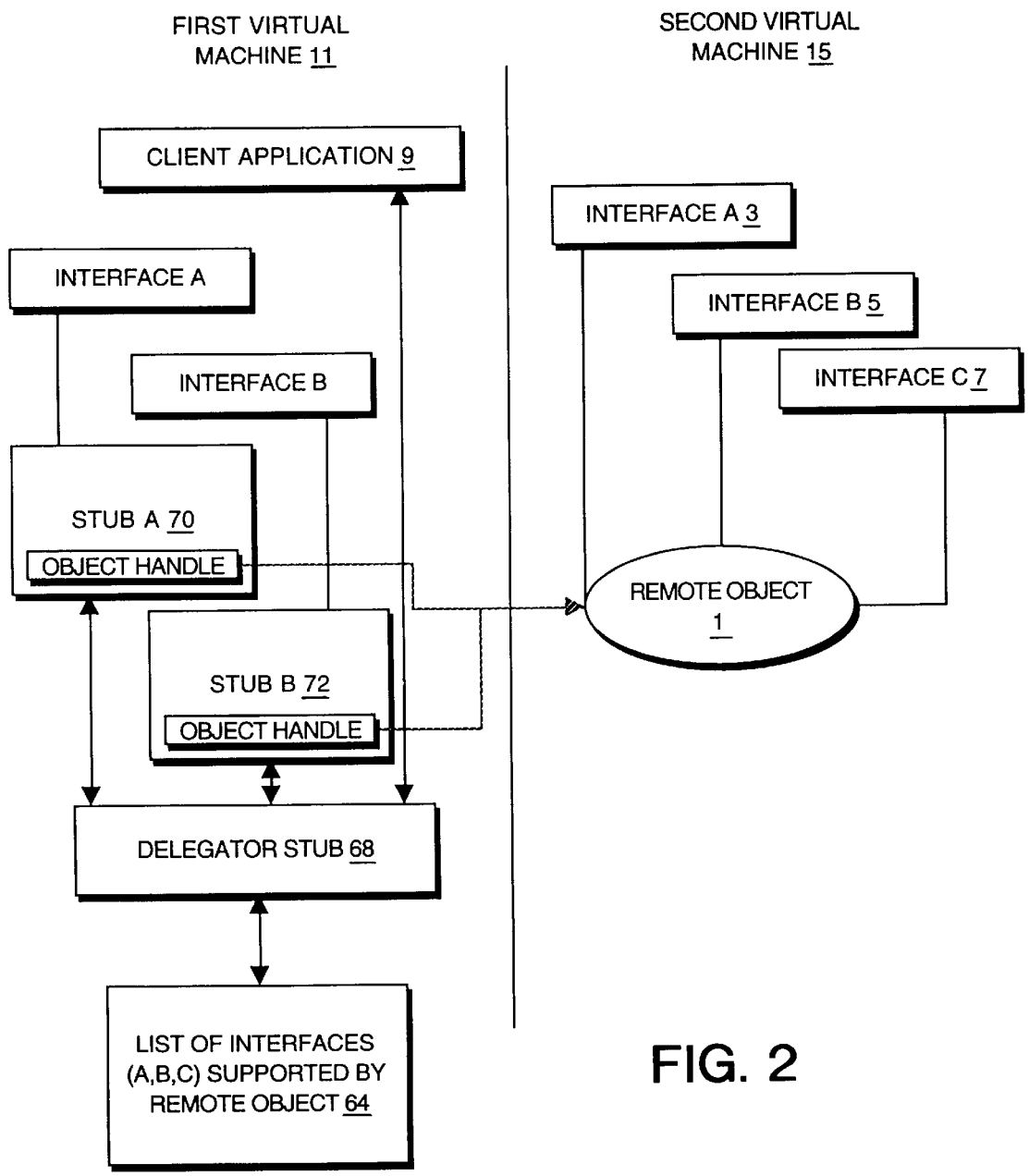
FIG. 2 illustrates an alternative embodiment of the present invention which employs a delegator stub to represent in a first virtual machine an object implemented in a second virtual machine.

FIG. 2 illustrates an alternative embodiment of the present invention which employs a delegator stub 68 to represent in a first virtual machine 11 an object 1 implemented in a second virtual machine 15. In this embodiment, the delegator stub 68 of the present invention is coupled to the client application 9 and an interface descriptor 64 that lists the interfaces supported by the remote object 1. In this embodiment, the delegator stub 68 delegates to interface-specific stubs. In this case, delegator stub 68 delegates to interface-specific stub A 70 and interface-specific stub B 72. Each of these interface-specific stubs includes a copy of the object handle 71 associated with remote object 1.

General Run-Time Stub Generation Mechanism

Figure 3:
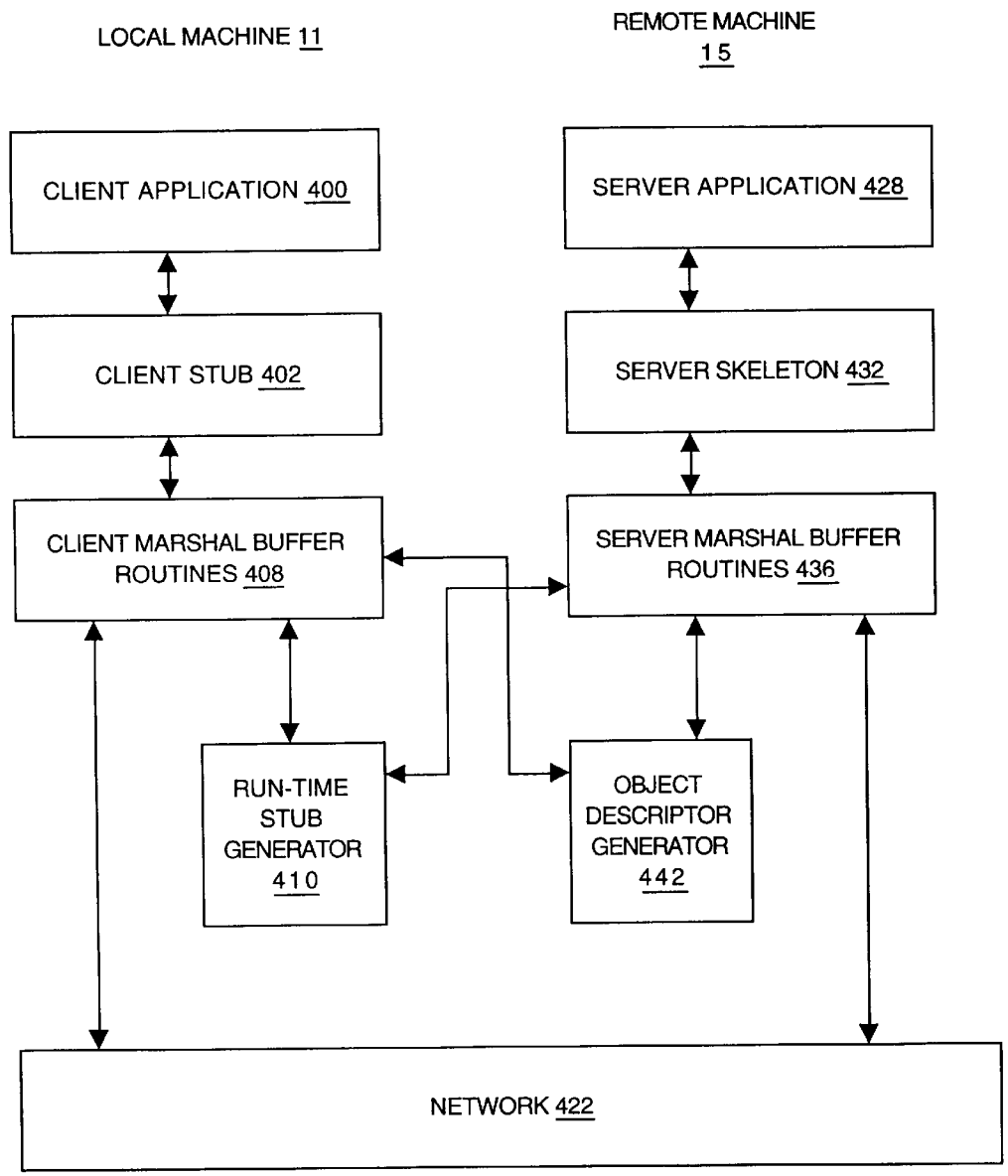
FIG. 3 illustrates a block diagram of a distributed system including a client machine and a server machine, according to one embodiment of the present invention.

FIG. 3 illustrates a block diagram of a distributed system including a first virtual machine 11 (e.g., a local machine) and a second virtual machine 15 (e.g., a remote machine), according to one embodiment of the present invention. The operation of this embodiment of the present invention will be illustrated with reference to the flowcharts of FIG. 4 and FIG. 5.

In FIG. 3, the client application 400 calls the client stub 402. The client stub performs the steps shown in FIG. 4 and then returns to the client application. The client stub is implemented on top of the client marshal buffer routines 408, which interact with the network 422, with the object descriptor generator 442 and with the run-time stub generator and the run-time stub generator 410.

Figure 4:
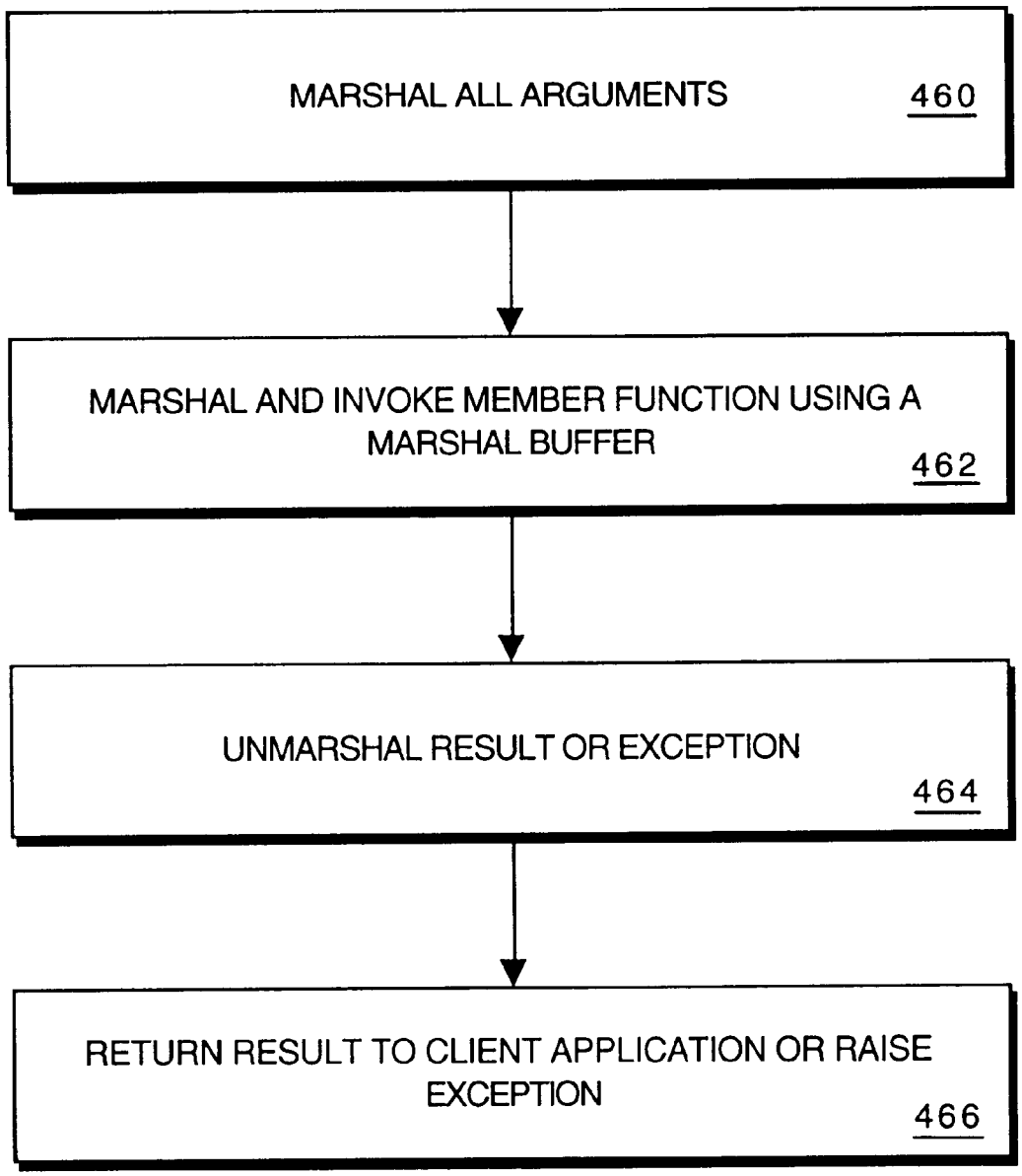
FIG. 4 is a flowchart illustrating the operation of the client machine shown in FIG. 3.

FIG. 4 is a flowchart illustrating the operation of a client stub 402 in FIG. 3. The stub first marshals all arguments 460, then it marshals and invokes the member function 462. At this moment, the remote member function is actually performed. On its completion, the client stub proceeds to unmarshal the result of the member function, or its exception 464, and then propagates this result or exception to the client application 466.

The client marshal buffer routines 408 can call a run-time stub generator 410 and object descriptor generator 442 according to the present invention. Equally, the server marshal buffer routines 463 can call the run-time stub generator 410 and object descriptor generator 442. Both object descriptor generator 442 and run-time stub generator 410 are described in greater detail hereinafter.

Figure 5:
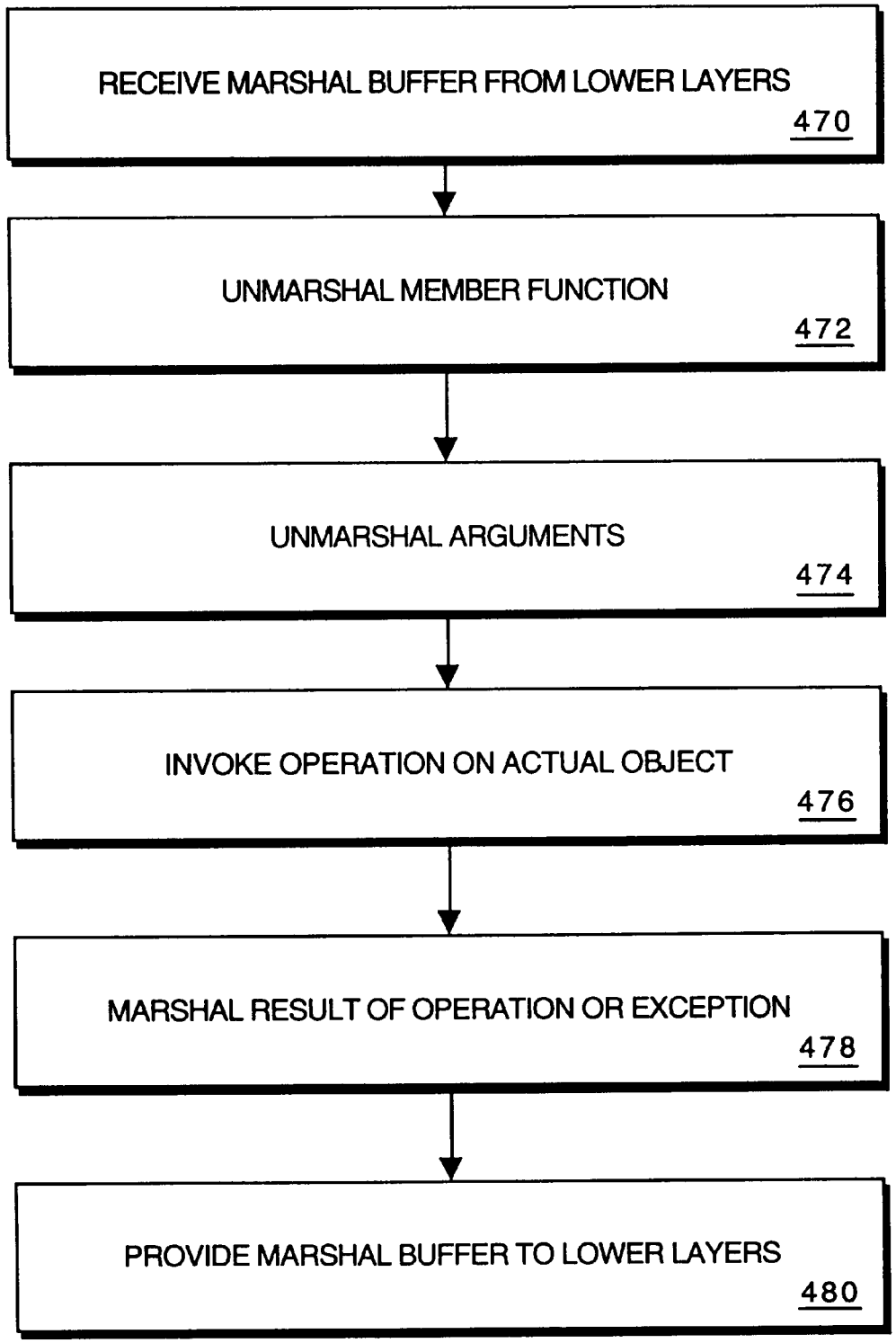
FIG. 5 is a flowchart illustrating the operation of the server machine shown in FIG. 3.

FIG. 5 is a flowchart illustrating the operation of the server machine 440 shown in FIG. 3. In step 470, the server skeleton 432 receives the marshal buffer from the server marshal buffer routines 436. In step 472, the server skeleton 432 unmarshals the member function. In step 474, the server skeleton 432 unmarshals the arguments. In step 476, the server skeleton 432 invokes the member function on the actual object by calling server application 428. The server skeleton 432 receives the result of the member function or an exception. In step 478, the server skeleton 432 marshals the result of the member function or exception. In step 480, the server skeleton 432 provides the marshal buffer to the lower layers (i.e., the server marshal buffer routines 436. The marshal buffer is transmitted via network 422 to the client 438.

Figure 6:
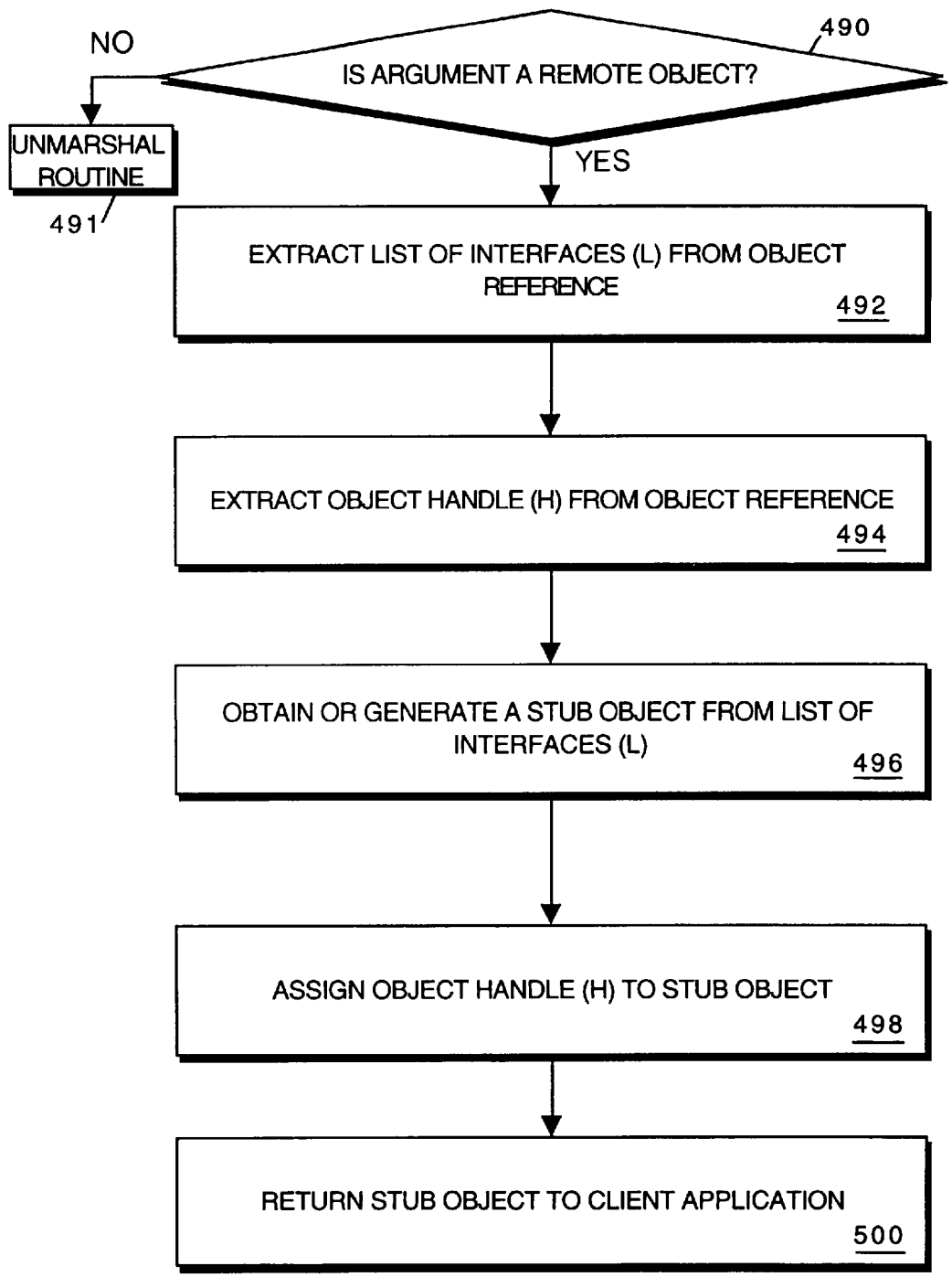
FIG. 6 is a flowchart illustrating the method of unmarshaling an argument or result of the present invention.

FIG. 6 is a flowchart illustrating the method of unmarshaling an argument or result of the present invention. These steps may be implemented in step 464 of FIG. 4 and step 474 of FIG. 5. In decision block 490, a marshal buffer routine 408 of the present invention determines if an argument or result is a remote object. If no, the processing proceeds to a typical unmarshal routine 491. For an example of prior art marshaling and unmarshaling techniques, please see *"Implementing Remote Procedure Calls"*, by Andrew D. Birrel, Bruce Jay Nelson, in ACM Transactions on Computer Systems (TOCS), Vol. 2, Number 1, February 1984, pp. 39–59. If yes, in step 492, the marshal routine 408 of the present invention extracts the interface descriptor (e.g., a list of interfaces) from the object reference. In step 494, the marshal routine of the present invention extracts the object handle from the object reference. An object handle is simply sufficient information so that a remote object may be accessed from the first virtual machine (e.g., the client machine). Typically, an object handle includes a machine address, as well as, an identification specifying where on that machine the object resides.

In step 496, a run-time stub generator 410 of the present invention obtains or generates a stub object from the interface descriptor (e.g., list of interfaces). In step 498, the present invention assigns the object handle to the stub object. In step 500, the stub object is returned to the client application 400. The run-time stub generator 410 of the present invention is described in greater detail hereinafter with reference to FIGS. 8, 9 and 10.

Figure 7:
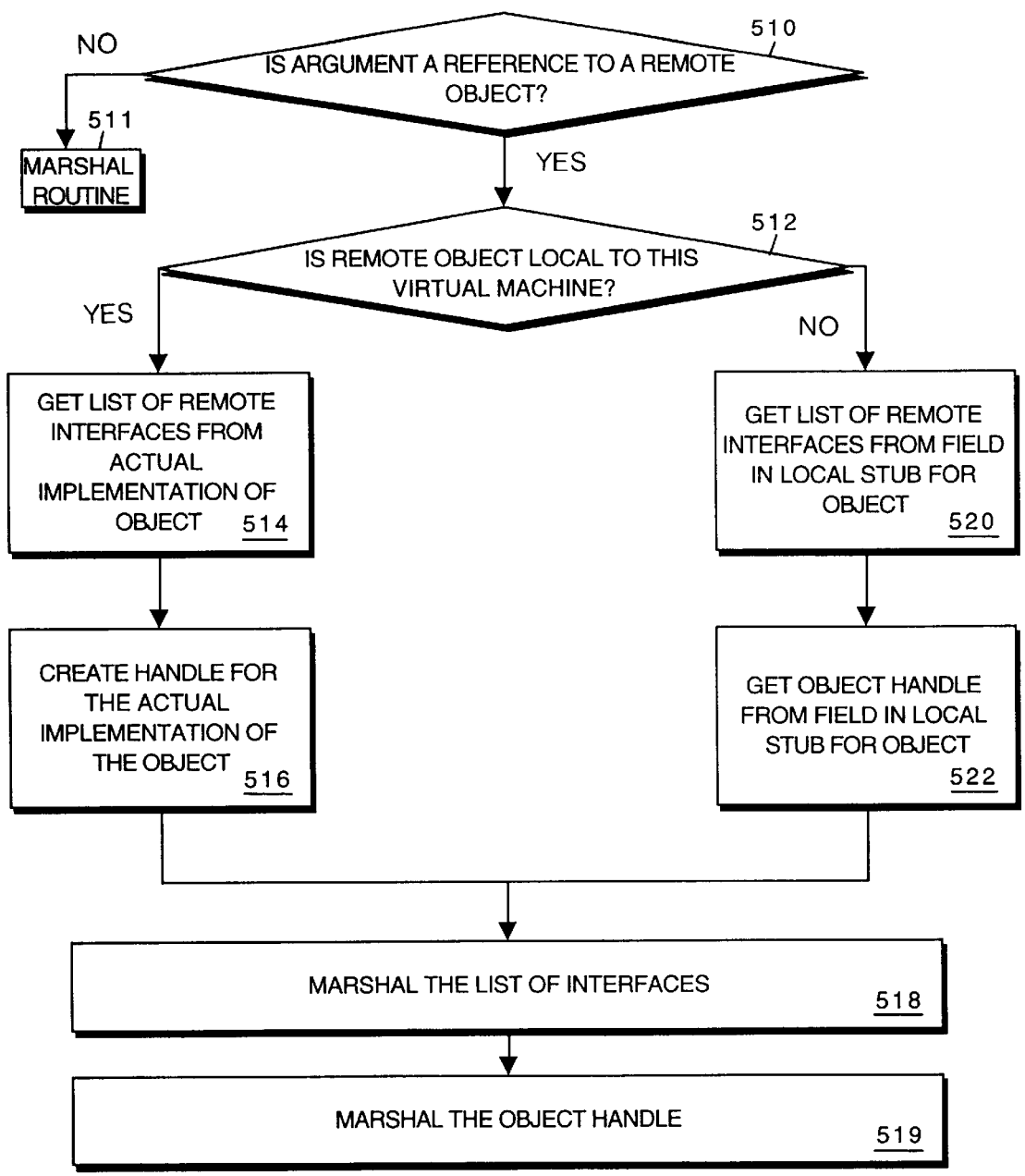
FIG. 7 is a flowchart illustrating the method of marshaling an argument or result of the present invention.

FIG. 7 is a flowchart illustrating the method of marshaling an argument or result of the present invention. This method of marshaling an argument or result of the present invention may be implemented in step 460 of FIG. 4 and step 478 of FIG. 5.

In step 510, a marshal routine of the present invention determines if an argument or result is a reference to a remote object. If no, the processing proceeds to a typical marshal routine 511. For an example of prior art marshaling and unmarshaling techniques, please see *"Implementing Remote Procedure Calls"*, by Andrew D. Birrel, Bruce Jay Nelson, in ACM Transactions on Computer Systems (TOCS), Vol. 2, Number 1, February 1984, pp. 39–59. If yes, the marshal routine of the present invention, in step 512, determines if a remote object is local to that virtual machine. If yes, in step 514 the marshal routine of the present invention obtains a list of remote interfaces from the actual implementation of the object on the first virtual machine. In step 516, the marshal routine of the present invention creates an object handle for the actual implementation of the object. In steps 518 and 519, the marshal routine of the present invention marshals the list of interfaces and the object handle.

If the query of decision block 512 is no, in step 520 the marshal routine of the present invention extracts a list of remote interfaces from a field in the local stub for the object. In step 522, the marshal routine of the present invention extracts the object handle from a field in the local stub for the object. In steps 518 and 519, the marshal routine of the present invention marshals the list of the interfaces and the object handle.

Figure 8:
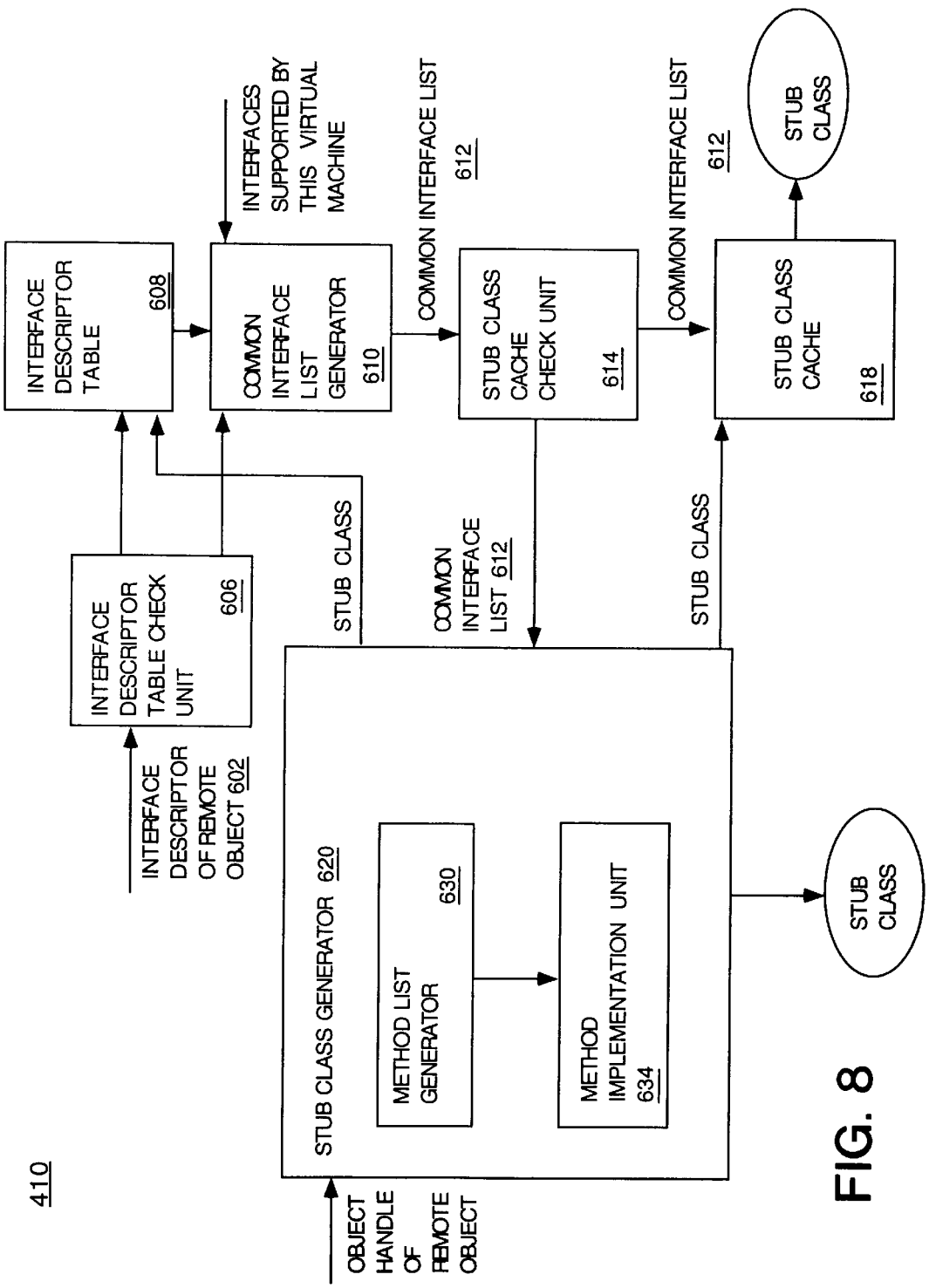
FIGS. 8 and 9 illustrates in greater detail the run-time stub generator of the present invention.
Figure 10:
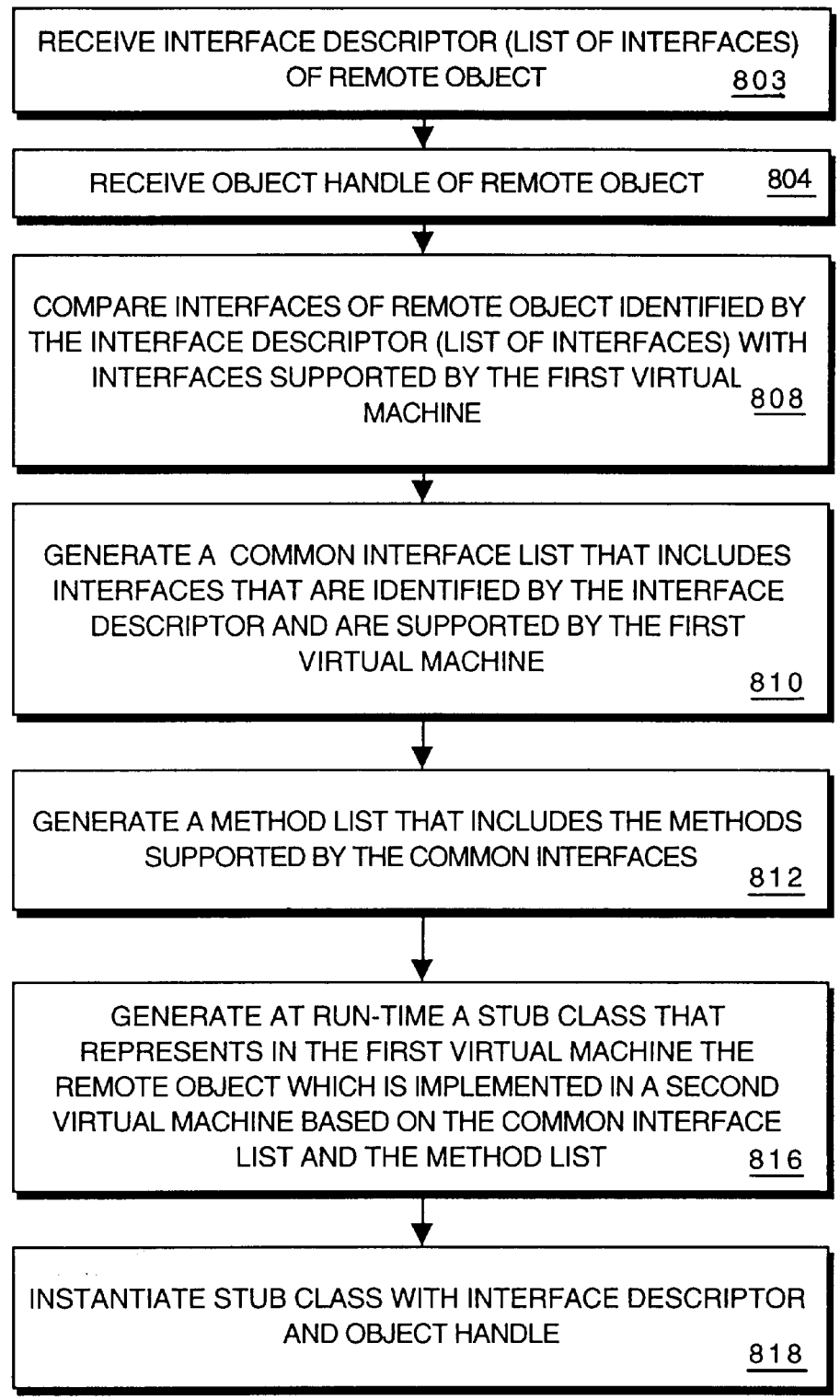
FIG. 10 is a flowchart illustrating a general overview of the operation of the run-time stub generator.

FIG. 8 illustrates in greater detail the run-time stub generator of the present invention. Blocks 606 and 608 implement an optional optimization to reduce network traffic. Blocks 614 and 618 are an optional optimization to reduce the cost to generate the stub class. The operation of the invention without involving any of these optional optimizations is first described. For a general overview of the operation of the run-time stub generator 620, the flowchart of FIG. 10 is illustrative.

The object descriptor generator 442 of the server machine 440 generates an object reference and marshals it. The object reference includes an interface descriptor and an object handle associated with the object (also referred to hereinafter as a remote object) implemented in the server. In step 804, the run-time stub generator 410 of the client machine 438 receives the interface descriptor. In step 808, the common interface list generator 610 of the run-time stub generator 410 compares the interface descriptor (e.g., a list of interfaces) with the interfaces supported by the client machine. In step 810, the common interface list generator 610 generates a common interface list 612. The common interface list 612 includes those interfaces that are supported by the client machine and also included in the interface descriptor (i.e., those interfaces of the remote object and the implemented in the second virtual machines supported by the first virtual machine).

In step 812, the member function list generator 630 of the stub class generator 620, generates a list of member functions supported by the common interfaces. In step 816, the member function implementation unit 634 generates a stub class that references the remote object based on the common interface list and the member function list at run-time. In other words, the member function implementation unit 634 of the stub class generator 620 of the present invention generates at run-time a stub class that represents in the first virtual machine (the client) the remote object which is implemented in a second virtual machine (e.g., server) based on the common interface list and the member function list.

A stub class instantiation mechanism 636 receives the stub class, the interface descriptor and the object handle and generates an instance of the stub class. In step 818, the present invention instantiates the stub class and creates an instance of the stub class based upon the stub class, the interface descriptor, and the object handle.

Referring again to FIG. 8, the run-time stub class generator 620 includes a member function list generator 630 and a list implementation unit 634.

The member function list generator 630 includes an input for the common interface list 612. Based on the common interface list 612, the member function list generator 630 generates a member function list corresponding to all the common interfaces. A member function implementation unit 634 is coupled to the member function list generator 630. The member function implementation unit 634 receives the member function list from the member function list generator 630. The implementation of a member function for a stub instance uses the information on its object handle and involves marshaling the arguments in a form that can be used to send across machines, invoking the remote member function, and then unmarshaling results (possibly including exceptions). The implementation of a stub member function can be determined, using known techniques, from the signature of the member function. The signature of a member function includes the name of the member function plus types of arguments and results. If the language explicitly lists the exceptions that a member function may generate, that list is included in the signature. The member function implementation unit 634 generates at run-time a stub class that represents in the first virtual machine (e.g., the client machine) the remote object which is implemented in a second virtual machine (e.g., server machine) based on the common interface list, the member function list, and the object handle.

An alternative embodiment of the present invention reduces the communication requirements to transmit interface descriptors. In this embodiment, all interface descriptors sent between two machines have an identifier tag. The first time a given interface descriptor is sent, the tag is followed by a complete interface descriptor, as presented in the invention. The next time the sending machine wants to send that interface descriptor to the same receiving machine, the tag is sent instead. This technique significantly reduces the communication cost for sending interface descriptors. This technique will be illustrated hereinafter with reference to FIGS. 18 and 19.

The stub class cache check unit 614 is coupled to the common interface list generator 610 for receiving the common interface list 612. Stub class cache check unit 614 is also coupled to a stub class cache 618 and a stub class generator 620. The stub class cache check unit 614 determines whether or not the common interface list 612 is in stub class cache 618. Stub table 618 includes a plurality of interface lists with associated stub class. If the common interface list 612 corresponds to one of the list identifiers in table 618, a stub class (or pointers to the class) may be generated (i.e., copied) from table 618. However, if the list of common interfaces 612 does not match any of the list identifiers in table 618, the stub class generator 620 is invoked to generate the stub class corresponding to the common interface list and then the cache is updated.

Figure 9:
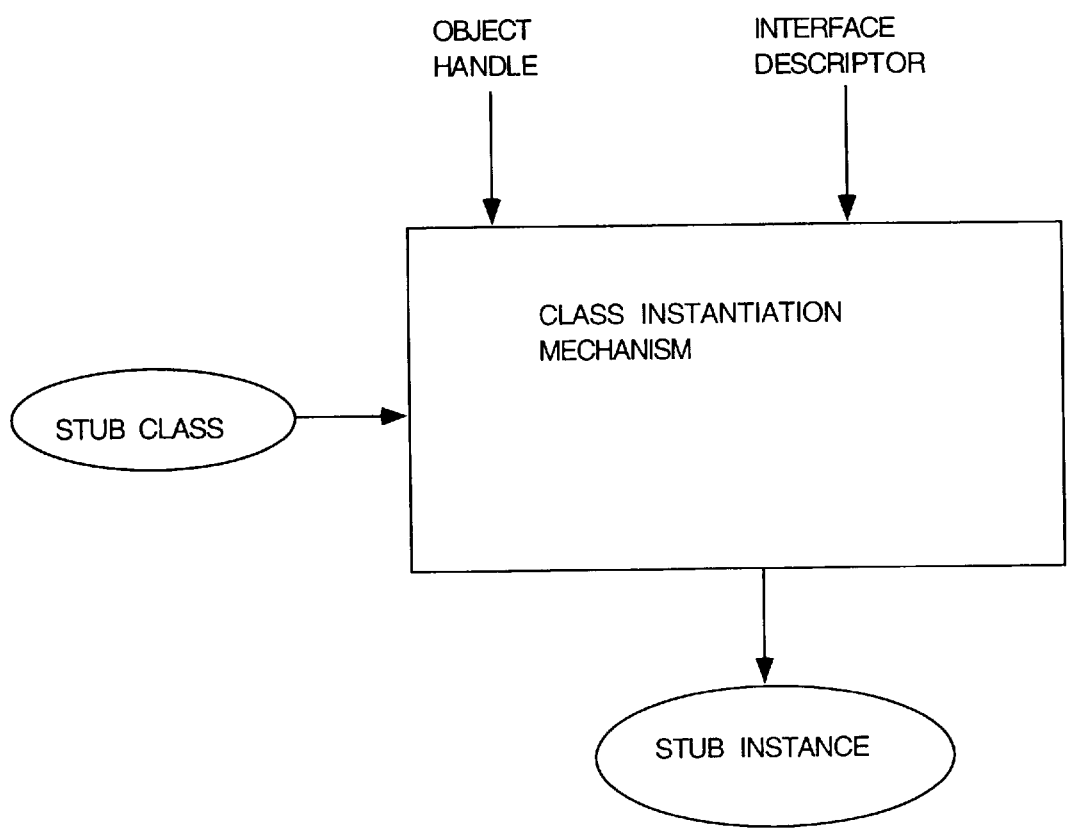

FIG. 9 illustrates the instance creation mechanism employed by the present invention. After the stub class is generated, the instance creation mechanism (shown in FIG. 9) is invoked. The instance creation mechanism, which is well known in the art, includes an input for receiving the stub class, and in response, generates an instance (i.e., an object) of that stub class.

FIG. 10 is a flowchart illustrating a general overview of the operation of the run-time stub generator. In step 803, the run-time stub generator receives an interface descriptor (e.g., a list of interfaces) of the remote object. In processing step 803, the run-time stub generator receives an object handle associated with the remote object. In processing step 808, the run-time stub generator compares the interfaces of the remote object identified by the interface descriptor with the interfaces supported by the first virtual machine (i.e., the local machine). In processing step 810, the run-time stub generator generates a common interface list that includes interfaces identified by the interface descriptor and also supported by the first virtual machine. In processing step 812, the run-time stub generator generates a member function list that includes the member functions defined by the interfaces listed in the common interface list. In processing step 816, the run-time stub generator generates a stub class that represents in the local machine the remote object that is implemented in the second virtual machine based on the common interface list and the member function list. In processing step 818, an instance of the stub classes having the interface descriptor and the object handle is created.

Delegator Stubs

FIGS. 11–16 illustrate an alternative embodiment of the present invention that reduces the time required to generate the stubs at execution time (run-time).

The key insight of this embodiment of the present invention is that the stub activity can be separated into a complex interface-specific class that does marshaling and unmarshaling for member functions of that interface, and a very simple stub that is dependent on all the interfaces supported by the object and present in the receiving machine that delegates to the interface-specific stubs. By recognizing this separability, the interface-specific stub (which is a moderately complex piece of software code) can be generated at compile-time, while the delegator stub can be generated at run-time. The generation of the delegator stub takes into consideration what interfaces are visible on the receiving address space, so that no additional information needs to be acquired by the receiving address space to operate on the received object reference.

Figure 11:
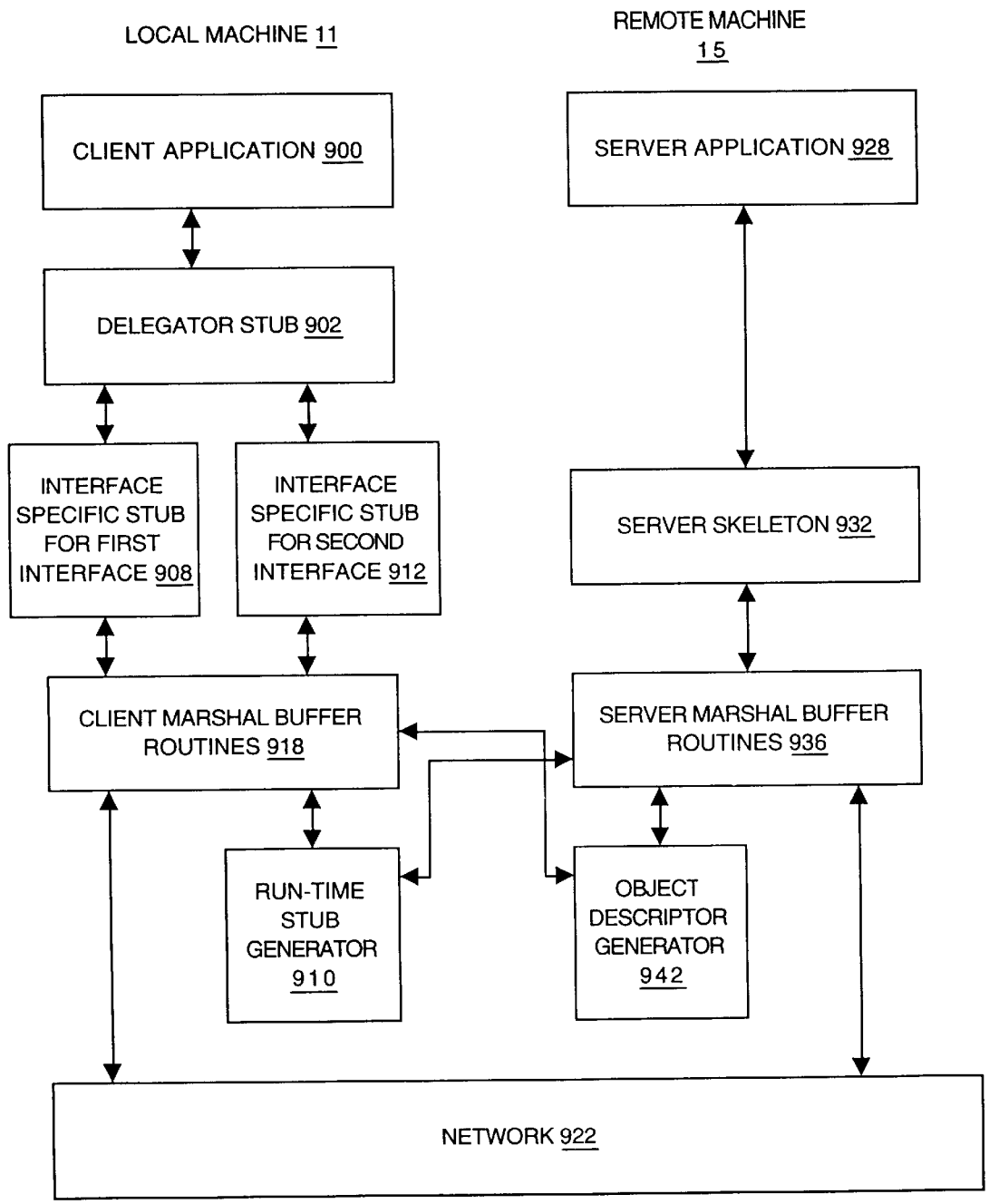
FIG. 11 illustrates a block diagram of a distributed system including a client machine and a server machine, according to an alternative embodiment of the present invention.
Figure 15:
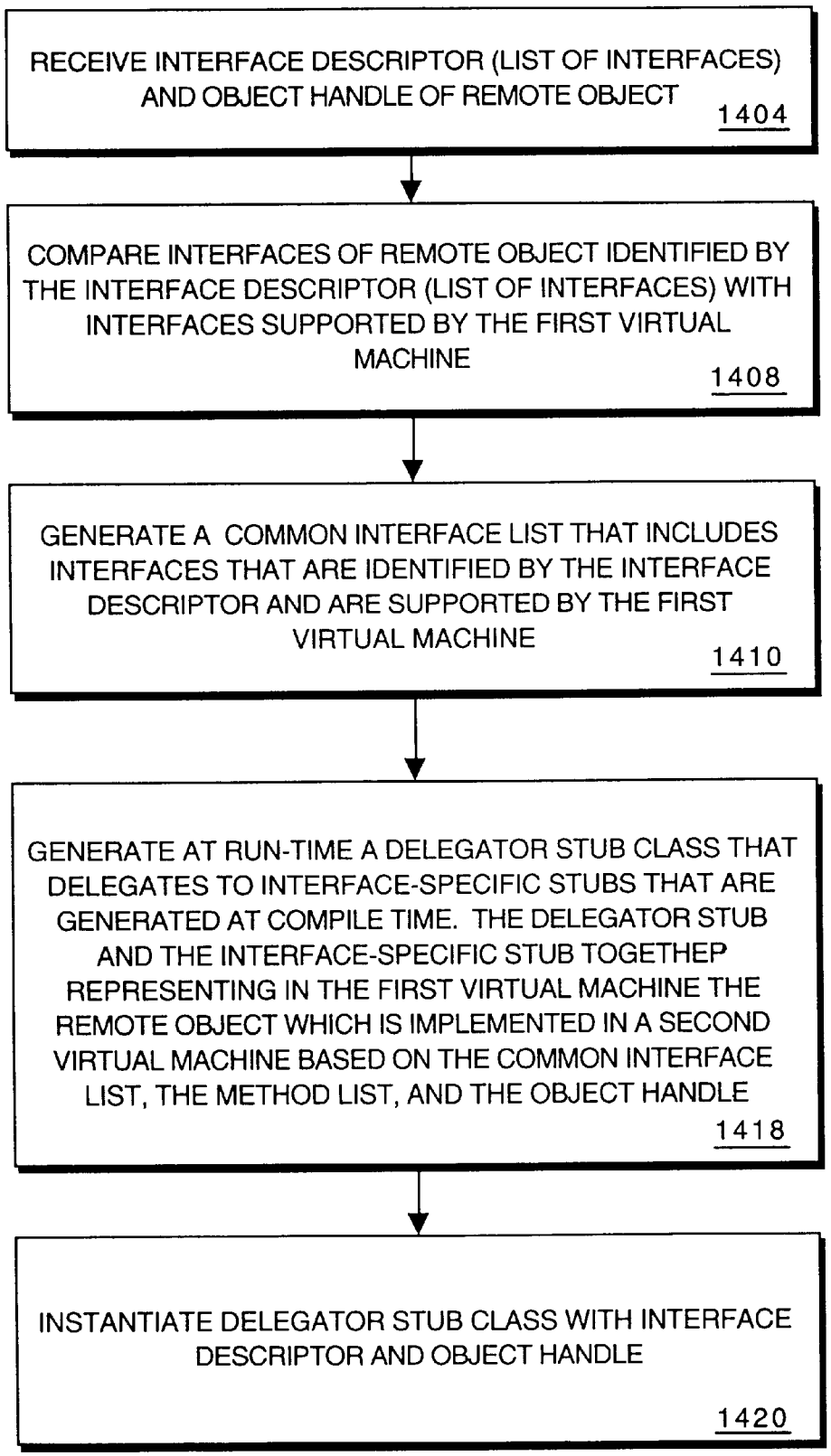
FIG. 15 is a flowchart illustrating the operation of the delegator stub generator.
Figure 16:
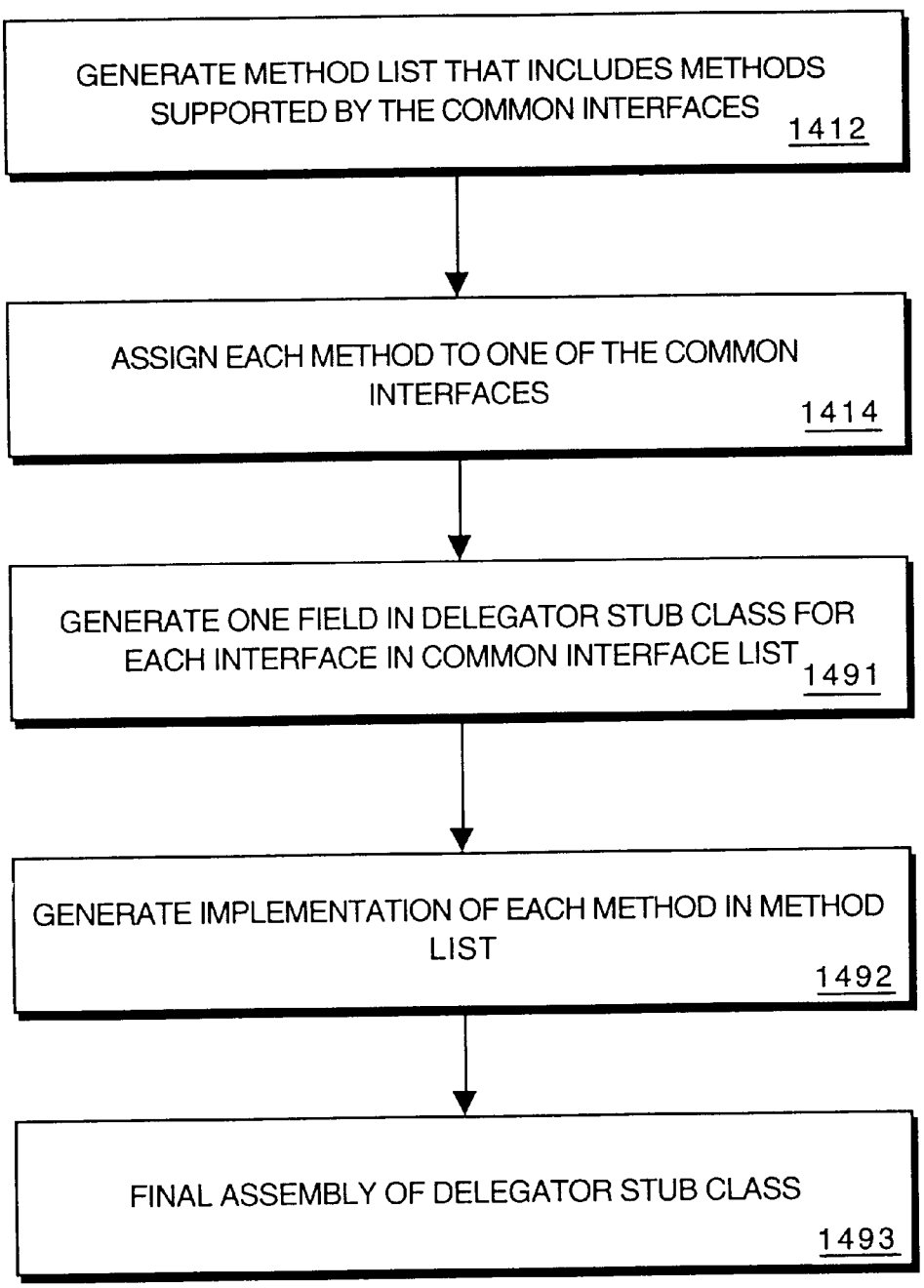
FIG. 16 is a flowchart further illustrating the operation of the delegator stub generator.

FIG. 11 illustrates a block diagram of a distributed system including a local machine 11 and a remote machine 15, according to an alternative embodiment of the present invention. The flowcharts of FIG. 12 and FIGS. 15–16 illustrate the operation of this alternative embodiment of the present invention.

Figure 12:
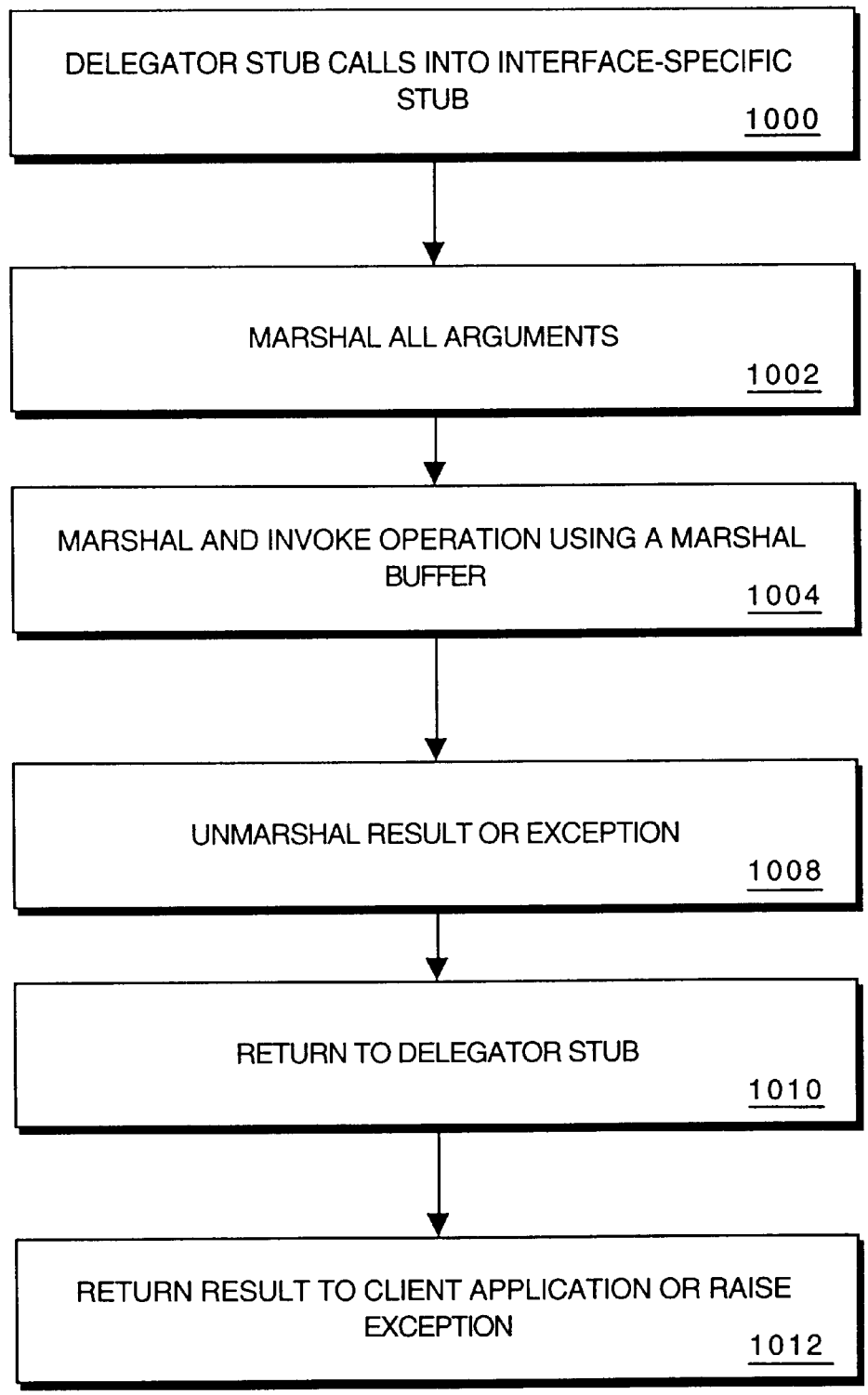
FIG. 12 is a flowchart illustrating the operation of the client machine shown in FIG. 11.

FIG. 12 is a flowchart illustrating the operation of the client machine 938 of FIG. 11. A client application 900 calls the delegator stub 902. In step 1000, the delegator stub calls at least one interface-specific stub 908, 912 corresponding to an interface that includes a desired member function. Although FIG. 11 shows an interface-specific stub for a first interface 908 and an interface-specific stub for a second interface 912, it will be apparent to those skilled in the art that the teachings of the present invention may be applied to a plurality of interface-specific stubs with each interface-specific stub corresponding to a particular interface. In step 1002, the interface-specific stub 908, 912 marshals all the arguments. The interface-specific stub 908, 912 calls the client marshal buffer routines 918. In step 1004, the client marshal buffer routines 918 marshal and invoke the member function using a marshal buffer. The marshal buffer is passed to the server machine 940 via the network 922. The client marshal buffer routines 918 may call the run-time delegator stub generator 910 of the present invention, which will be described in greater detail hereinafter.

In step 1008, the client marshal buffer routines 918 unmarshal the result or exception In step 1010, the interface-specific stub returns to the delegator stub 902. In step 1012, the delegator stub 902 returns the result to the client application 900 or raises an exception.

The operation of the server 940 of FIG. 11 is illustrated in FIG. 5. Moreover, the unmarshal routine of the present invention, as illustrated in FIG. 6, may be implemented in step 1008 of FIG. 12. Also, the marshal routine of the present invention may be implemented in step 1002 of FIG. 12.

Figure 13:
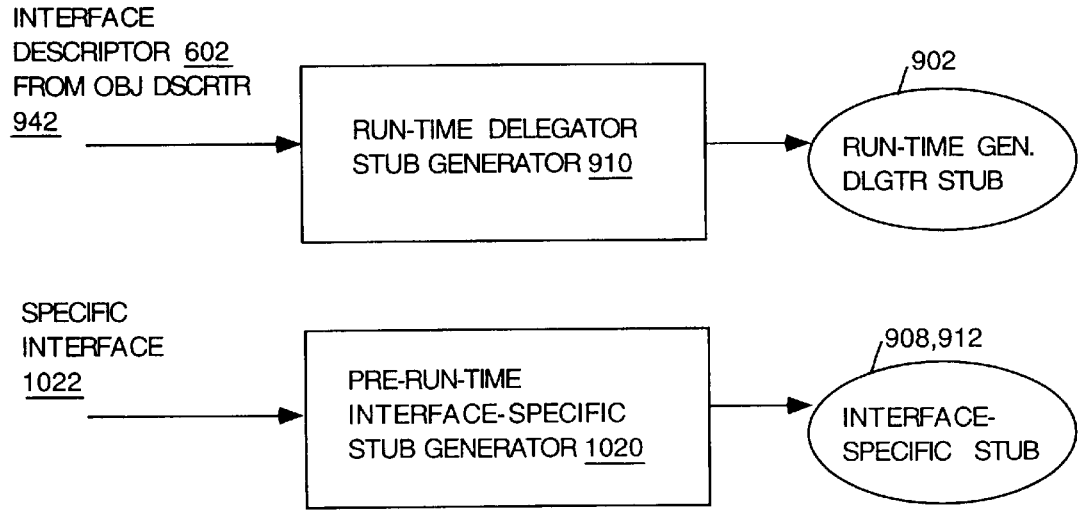
FIG. 13 illustrates a block diagram of a run-time delegator stub generator and a compile time interface specific stub generator of the present invention.

FIG. 13 illustrates a block diagram of a run-time delegator stub generator and a pre-run-time interface specific stub generator of the present invention. A run-time delegator stub generator 910 has an input for receiving an interface descriptor 602 from the server machine 940. The run-time delegator stub generator 910 generates a run-time generator delegator stub 902 based upon the interface descriptor 602 and the object handle. The run-time delegator stub generator 910 will be described in greater detail hereinafter with respect to FIGS. 14–16.

The pre-run-time interface specific stub generator 1020 includes an input for receiving a specific interface 1022. The pre-run time interface specific stub generator 1020 generates the interface specific stub 908, 912 corresponding to that particular interface. The interface specific stub generator 1020 will be described in greater detail hereinafter.

Figure 14:
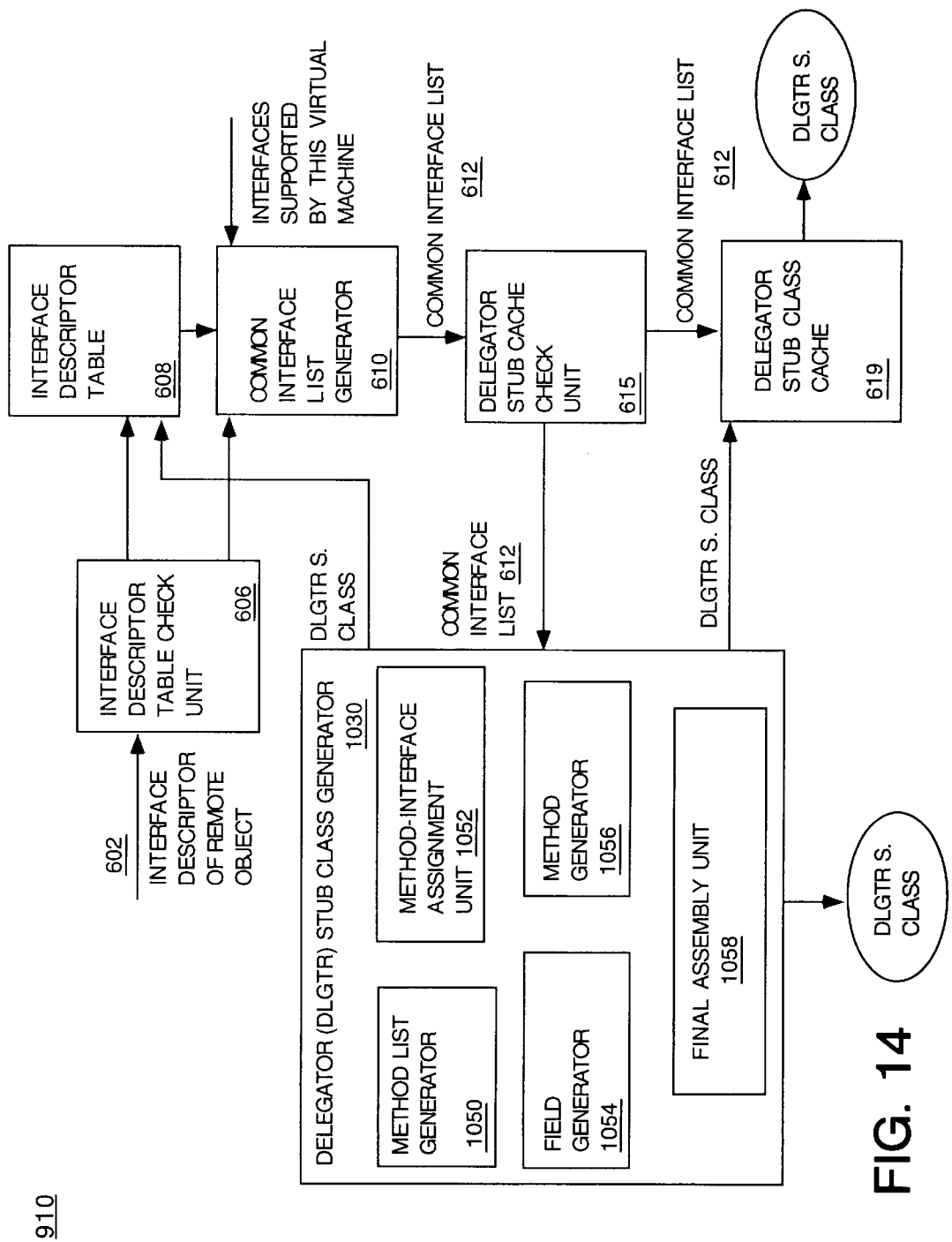
FIG. 14 illustrates in greater detail the delegator stub generator of the present invention.

FIG. 14 illustrates in greater detail the delegator stub generator of the present invention. As in FIG. 8, blocks 606 and 608 implement an optional optimization to reduce network traffic, while blocks 615 and 619 are an optional optimization to reduce the cost to generate the delegator stub class. As noted, the teaching of the present invention can be implemented in a system without these optional optimizations. The operation of the delegator stub generator will be described with reference to FIGS. 15 and 16.

FIG. 15 is a flowchart illustrating the operation of the delegator stub generator 1200. A second virtual machine 940 (e.g., a server machine) sends an object reference that indicates a list of interfaces and object handle information to the delegator stub generator 910 of a first virtual machine 938 (e.g., a client). The run-time delegator stub generator 910 generates the delegator stub class at run-time based upon the common interface list, the member function list. It then instantiates this class passing it the interface descriptor and the object handle. Specifically, this interface descriptor (e.g., a list of interfaces) and object handle information is provided to the common interface list generator 610. In step 1404, the client machine 938 receives this list of interfaces and object handle information. In step 1408, the common interface list generator 610 compares the list of interfaces with interfaces supported by the client machine 938. In step 1410, the common interface list generator 610 generates a common interface list. The common interface list includes those interfaces supported by the client that matched an interface on the list of interfaces.

In step 1418, the present invention generates at run-time a delegator stub class that delegates to interface-specific stubs that are generated at compile time. The delegator stub and the interface-specific stub together representing in the first virtual machine the remote object which is implemented in a second virtual machine based on the common interface list and the member function list.

In step 1420, the present invention instantiates the delegator stub class with the interface descriptor and the object handle.

FIG. 16 describes in greater detail the additional steps of processing step 1418 of FIG. 15.

In step 1412, the delegator class generation mechanism 1030, that receives a list of common interfaces from the common interface list generator 610, generates a list of member functions that are supported by the common interfaces. Specifically, the member function list generator 1050 of the delegator class generation mechanism 1030 generates this list of member functions. In step 1414, the member function-interface assignment unit 1054 assigns each member function of the member function list to one of the common interfaces. In step 1491, the field generator unit, 1054, generates one field per interface in the list of common interfaces. The fields are of type reference to the interface-specific stubs, specifically that stub corresponding to the interface being considered.

In step 1492, the member function generator unit 1056 generates the implementation for each member function in the member function list. The member function generator 1056 of the present invention generates a member function for the delegator stub having the same signature (e.g., the same name, arguments, return type, and exception list) as the member function in the member function list. This new member function invokes the member function of the same name of the object referred to by the field in the generated class and corresponds to an interface associated with that member function. In step 1493 the final assembly unit 1058 of the present invention generates a delegator stub class having these member functions and these fields. The delegator stub class has a field to hold the list of common interfaces. The interface-specific stubs have fields to hold the object handle.

An example of the run-time stub class employed by the present invention is as follows:

| | |
|---|---|
| | RUN-TIME STUB CLASS { |
| FIELD: | INTERFACE DESCRIPTOR (e.g., a list of interface) |
| FIELD: | OBKECT HANDLE; |
| METHOD: | Afoo ( ) { |
| | [code] |
| | } |
| | Nfoo ( ) { |
| | [code] |
| | } |

| | |
|---|---|
| | DELAGATOR STUB CLASS { |
| FIELD: | INTERFACE DESCRIPTOR (e.g., a list of interface) |

```
FIELDS:         INTERFACE_A_STUB;
                INTERFACE_B_STUB;
METHOD:         Afoo ( ) {
                    INETRFACE_A_STUB.Afoo ( );
                }
                Cfoo ( ) {
                    INTERFACE_B_STUB.Cfoo ( );
                }
                .
                .
```

Figure 18:
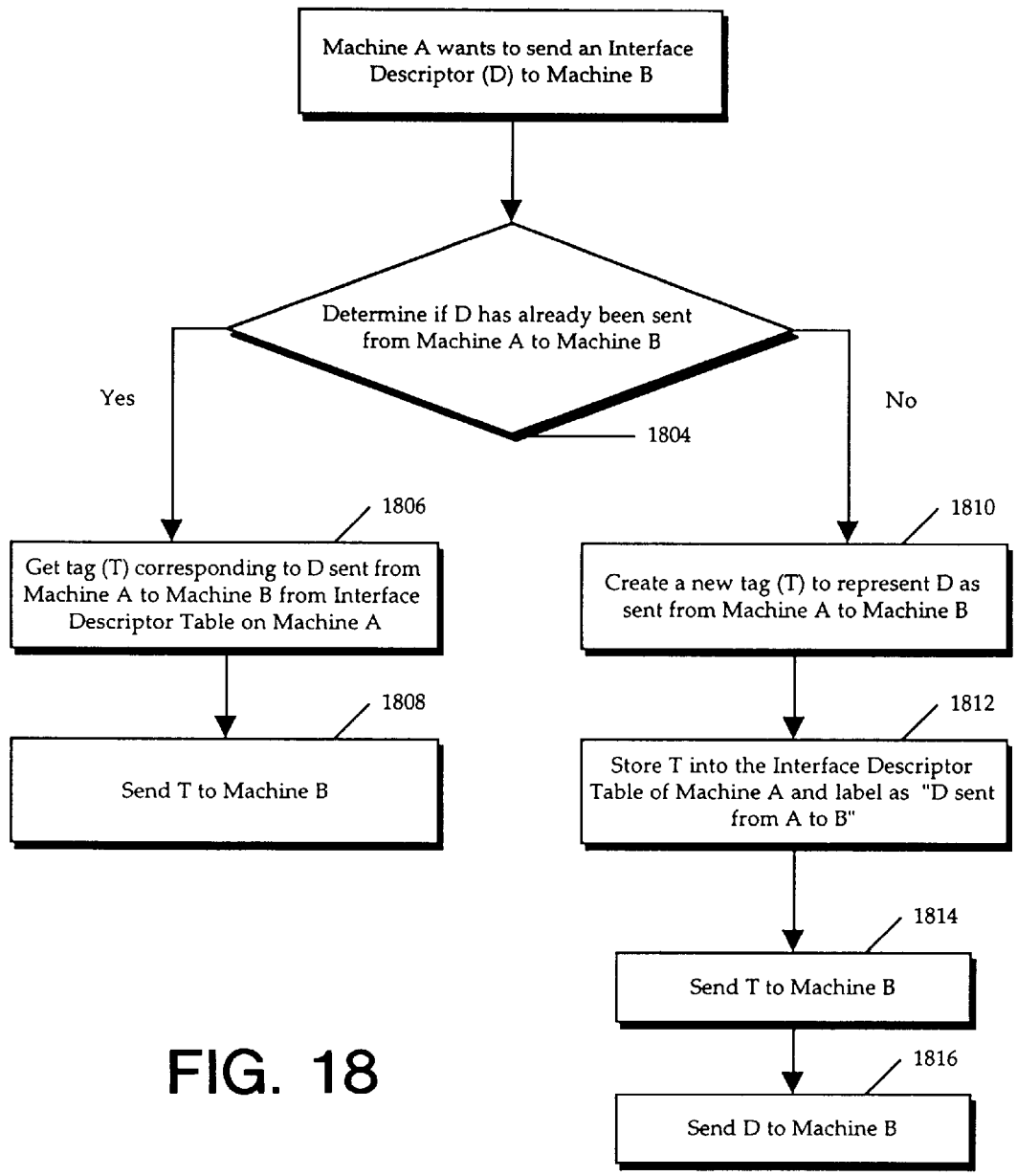
FIGS. 18 and 19 are flowcharts that provide details of the use of interface descriptor tables.
Figure 19:
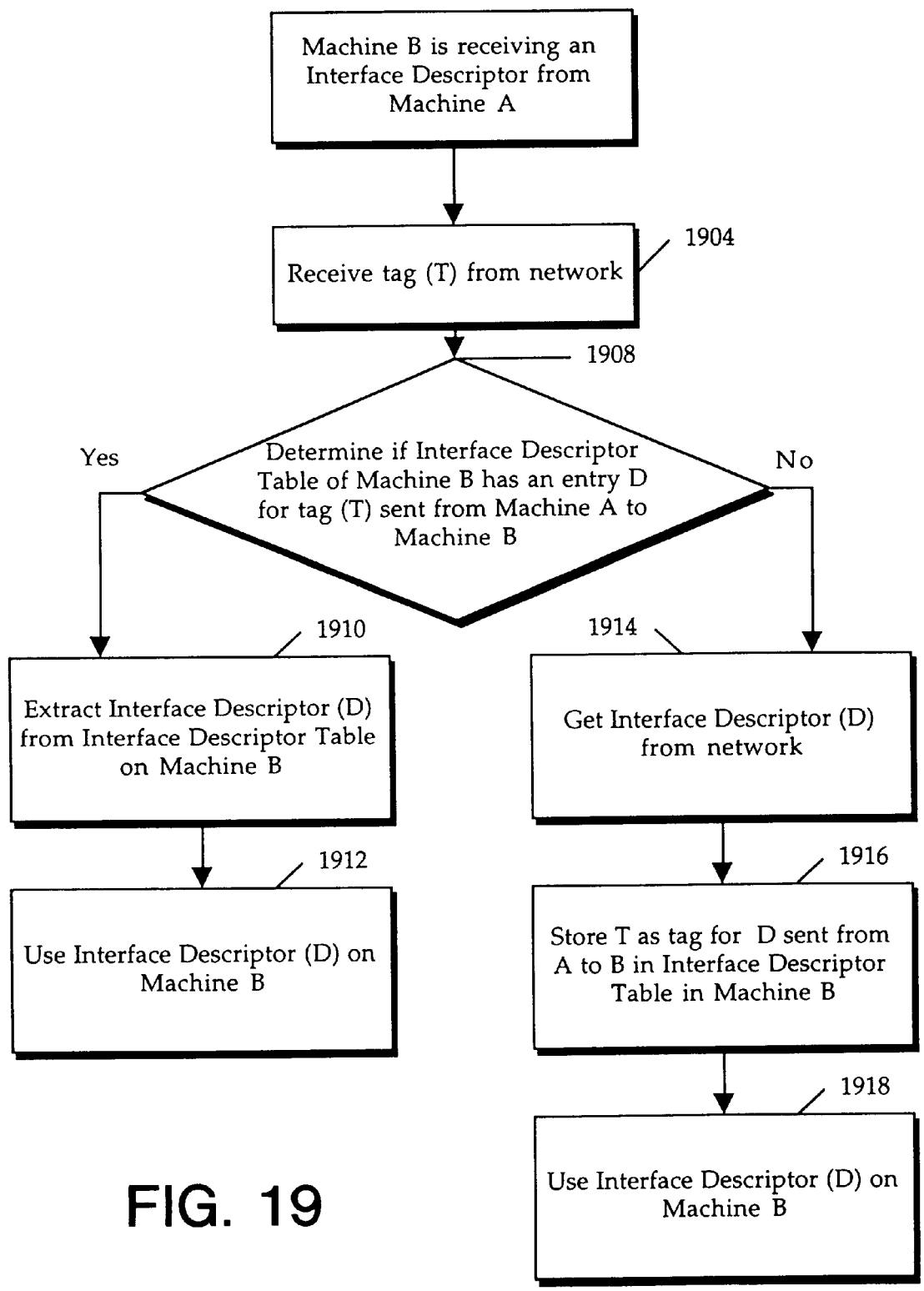

FIGS. 18 and 19 are flowcharts for how the present invention employs the interface descriptor table. FIG. 18 describes the operations performed by block 519. If a machine A wants to send an interface D to machine B, then it first checks if it has already done so (decision block 1804). This is done by consulting the Interface Descriptor Table. If the interface descriptor D has never been sent between A and B, then a new tag T is created (processing step 1810). In processing step 1812, the Interface Descriptor Table is updated to record the association of T with the transmission of D from A to B. In processing steps 1814, 1816, the tag T and the interface description D are marshaled and sent across the network. If, on the other hand, the interface descriptor D has previously been sent between A and B, then the Interface Description Table is consulted, the tag T previously used is extracted (processing step 1806), and only T is marshaled and sent across the network (processing step 1808).

FIG. 19 describes the operations performed by block 803 in FIG. 10; they correspond to the Interface Descriptor Table Check Unit 606 and the table 608. FIG. 19 is a flowchart illustrating the step of machine B receiving an interface descriptor D from machine A. In processing step 1904, machine B receives tag (T) from the network. In decision block 1908, a determination is made whether the interface descriptor table of machine B has an entry D for tag T sent from machine A to machine B. If yes, in processing step 1910, the interface descriptor is extracted from the interface descriptor table on machine B. In processing step 1912, machine B uses the interface descriptor D provided by the interface descriptor table.

If the determination in determination block 1909 is no, in step 1914, machine B receives an interface descriptor D from the network. In processing step 1916, tag T is stored into interface descriptor table of machine B. This tag is for an interface descriptor D sent from machine A to machine B. In processing step 1918, machine B uses the interface descriptor D.

The solution to the problem is influenced by the language used. Although the present invention is described with reference to the Java language programming, it will be appreciated by those skilled in the art that the ideas described herein can be implemented in other systems.

Figure 17:
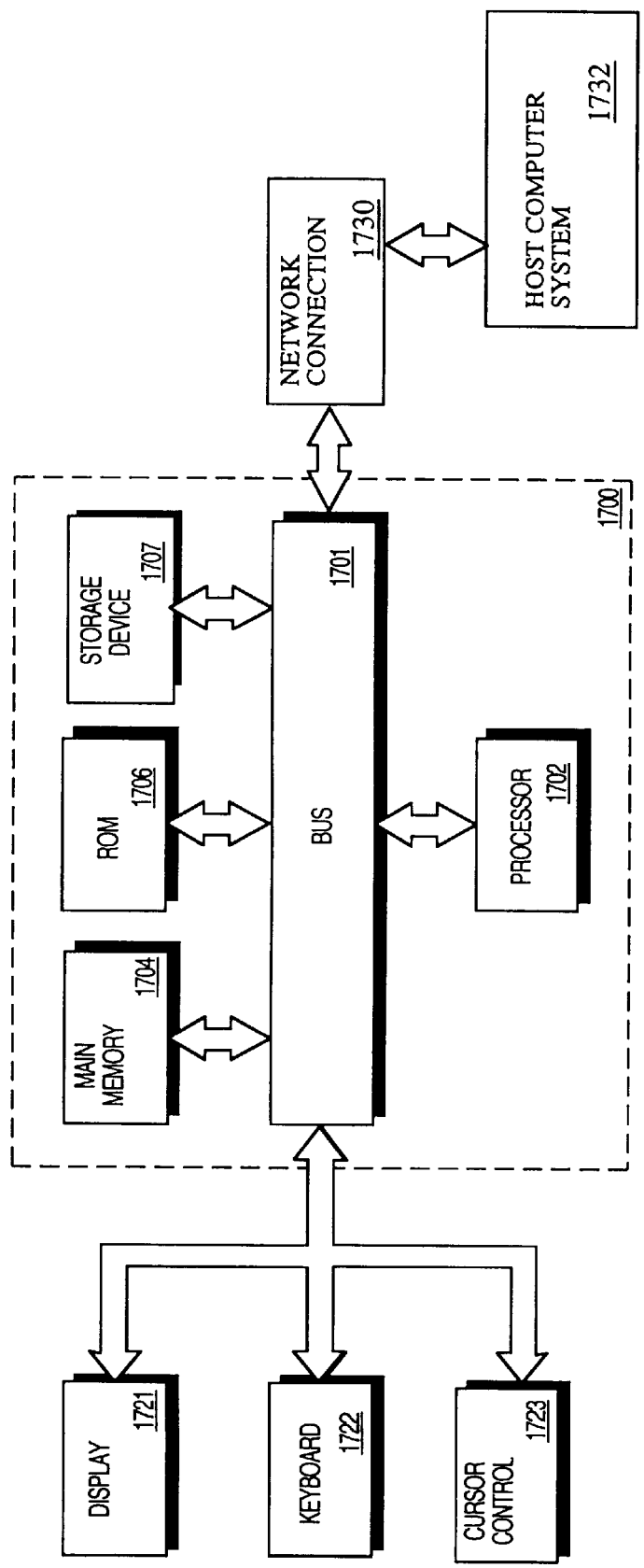
FIG. 17 illustrates a computer system in which the present invention may be implemented.

FIG. 17 is a block diagram of a computer system 100 in which an embodiment of the present invention can be implemented. Computer system 1700 comprises a bus 1701 or other communication means for communicating information, and a processor 1702 coupled with bus 1701 for processing information. Computer system 1700 further comprises a random access memory (RAM) or other dynamic storage device 1704 (referred to as main memory), coupled to bus 1701 for storing information and instructions to be executed by processor 1702. Main memory 1704 also may be used for storing temporary variables or other intermediate information during execution of instructions by processor 1702. Computer system 1700 also comprises a read only memory (ROM) and/or other static storage device 1706 coupled to bus 1701 for storing static information and instructions for processor 1702. Data storage device 1707 is coupled to bus 1701 for storing information and instructions.

A data storage device 1707 such as a magnetic disk or optical disk and its corresponding disk drive can be coupled to computer system 1700. Computer system 1700 can also be coupled via bus 1701 to a display device 1721, such as a cathode ray tube (CRT), for displaying information to a computer user. An alphanumeric input device 1722, including alphanumeric and other keys, is typically coupled to bus 1701 for communicating information and command selections to processor 1702. Another type of user input device is cursor control 1723, such as a mouse, a trackball, or cursor direction keys for communicating direction information and command selections to processor 1702 and for controlling cursor movement on display 1721. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 1722 wherein all interface is provided via the stylus as a writing instrument (like a pen) and the written text is interpreted using optical character recognition (OCR) techniques.

The present invention is related to the use of computer system 1700 to represent a remote object implemented in a second virtual machine by employing a routine stub or a delegator stub. According to one embodiment, a method and apparatus for representing a remote object implemented in a second virtual machine by employing a routine stub or a delegator stub is performed by computer system 1700 in response to processor 1702 executing sequences of instructions contained in memory 1704. Execution of the sequences of instructions contained in memory 1704 causes processor 1702 to represent a remote object implemented in a second virtual machine by employing a routine stub or a delegator stub, as will be described hereafter.

The instructions may be loaded into memory 1704 from a persistent store, such as disk 1707, and/or from one or more other computer systems 1732 (collectively referred to as a "host computer system") over a network connection. For example, a host computer system 1732 may transmit a sequence of instructions to computer system 1700 in response to a message transmitted to the host computer system over a network by computer system 1700. As computer system 1700 receives the instructions over the network connection 1730, computer system 1700 stores the instructions in memory 1704. Computer system 1700 may store the instructions for later execution, or execute the instructions as they arrive over the network connection.

In some cases, the instructions may be instructions directly supported by processor 1702. Consequently, execution of the instructions may be performed directly by processor 1702. In other cases, the instructions may not be directly executable by processor 1702. Under these circumstances, the instructions may be executed by causing processor 1702 to execute an interpreter that interprets the instructions, or by causing processor 1702 to execute instructions which convert the received instructions to instructions which can be directly executed by processor 1702.

In alternative embodiments, hard-wired circuitry may be used in place of or in combination with software instructions to implement the present invention. Thus, the present invention is not limited to any specific combination of hardware circuitry and software, nor to any particular source for the instructions executed by computer system 1700.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A method for representing in a first virtual machine a remote object implemented in a second virtual machine by employing a stub class, said method comprising the steps of:
   a) receiving an object reference to said remote object from said second virtual machine, said object reference having information associated with said remote object, said information including an interface descriptor and an object handle of said remote object, said object handle for identifying said remote object, said interface descriptor identifying an interface of said remote object implemented in the second virtual machine;
   b) transforming at run-time said information associated with the remote object into a stub class, said stub class representing said remote object and implementing only those interfaces identified by said interface descriptor and defined by the first virtual machine; and
   c) instantiating said stub class and providing the first virtual machine with an instance associated with said stub class, said instance including said interface descriptor and said object handle.

2. The method for representing in a first virtual machine a remote object implemented in a second virtual machine of claim 1, wherein the step of transforming at run-time the information associated with the remote object into a stub class further comprises the steps of:
   a) comparing said list of interfaces with interfaces defined by the first virtual machine;
   b) generating a common interface list, said common interface list including those interfaces defined by the first virtual machine and identified by said interface descriptor; and
   c) generating said stub class based on said common interface list.

3. The method for representing in a first virtual machine a remote object implemented in a second virtual machine of claim 2, wherein the step of generating said stub class based on said common interface list further comprises the steps of:
   a) generating a member function list, said member function list including the member functions defined by the common interfaces;
   b) for each member function in said member function list generating a first sequence of code for marshaling the argument into a marshal buffer, a second sequence of code for invoking a corresponding member function on the remote object, a third sequence of code for unmarshaling one of a return value or exception, and a fourth sequence of code for returning one of said return value or said exception; and
   c) generating said stub class at run-time, said stub class based on the common list of interfaces and the member function list, said stub class including code to implement the member function of said member function list.

4. The method for representing in a first virtual machine a remote object implemented in a second virtual machine of claim 1, wherein said interface descriptor includes a list of interfaces.

5. The method for representing in a first virtual machine a remote object implemented in a second virtual machine of claim 2, wherein the step of generating said stub class based on said common interface list further includes the steps of:
   a) generating a member function list, said member function list including the member functions defined by the common interfaces;
   b) generating at least one interface specific stub class at compile time based on the common interface list, the member function list and the object handle associated with the remote object; and
   c) generating a delegator stub class at run-time based on the common list interfaces and the member function list, said delegator stub class delegating to said interface specific stub.

6. The method of claim 5, further comprising the steps of
   a) instantiating said interface specific stub class based on the interface descriptor and the object handle and providing the first virtual machine with an instance associated with said stub class; and
   b) instantiating said delegator stub class based on the interface descriptor and the object handle and providing the first virtual machine with an instance associated with said delegator stub class.

7. The method of claim 5, wherein said interface specific stub includes code to implement all the member functions in said member function list.

8. The method of claim 7, wherein said delegator stub class includes code that delegates to said implementation code of said interface specific stub.

9. A method for enabling a target computer to represent in a first virtual machine a remote object implemented in a second virtual machine by employing a stub class; the method comprising the step of transmitting sequences of instructions from a host computer to a target computer, the sequence of instructions including instructions which, when executed on the target computer, cause the target computer to perform the steps of:
   a) receiving an object reference to said remote object from said second virtual machine, said object reference having information associated with said remote object, said information including an interface descriptor and an object handle of said remote object, said object handle for identifying said remote object, said interface descriptor identifying an interface of said remote object implemented in the second virtual machine;
   b) transforming at run-time said information associated with the remote object into a stub class, said stub class representing said remote object and implementing only those interfaces identified by said interface descriptor and defined by the first virtual machine; and
   c) instantiating said stub class and providing the first virtual machine with an instance associated with said stub class, said instance including said interface descriptor and said object handle.

10. The method for enabling a target computer to represent in a first virtual machine a remote object implemented in a second virtual machine by employing a stub class of claim 9, wherein the step of transforming at run-time the information associated with the remote object into a stub class further comprises the steps of:
   a) comparing said list of interfaces with interfaces defined by the first virtual machine;
   b) generating a common interface list, said common interface list including those interfaces defined by the first virtual machine and identified by said interface descriptor; and
   c) generating said stub class at based on said common interface list.

11. The method for enabling a target computer to represent in a first virtual machine a remote object implemented in a second virtual machine by employing a stub class of claim 10, wherein the step of generating said stub class based on said common interface list further comprises the steps of:
   a) generating a member function list, said member function list including the member functions defined by the common interfaces;
   b) for each member function in said member function list generating a first sequence of code for marshaling the argument into a marshal buffer, a second sequence of code for invoking a corresponding member function on the remote object, a third sequence of code for unmarshaling one of a return value or exception, and a fourth sequence of code for returning one of said return value or said exception; and
   c) generating said stub class at run-time, said stub class based on the common list of interfaces and the member function list, said stub class including code to implement the member function of said member function list.

12. The method for enabling a target computer to represent in a first virtual machine a remote object implemented in a second virtual machine by employing a stub class of claim 9, wherein said interface descriptor is a list of interfaces.

13. The method for enabling a target computer to represent in a first virtual machine a remote object implemented in a second virtual machine by employing a stub class of claim 10, wherein the step of generating said stub class based on said common interface list further comprising the steps of:
   a) generating a member function list, said member function list including the member function defined by the common interfaces;
   b) generating at least one interface specific stub class at compile time based on the common interface list, the member function list and the object handle associated with the remote object; and
   c) generating a delegator stub class at run-time based on the common list interfaces and the member function list, said delegator stub class delegating to said interface specific stub.

14. The method for enabling a target computer to represent in a first virtual machine a remote object implemented in a second virtual machine by employing a stub class of claim 13, further comprising the steps of
   a) instantiating said interface specific stub class based on the interface descriptor and the object handle and providing the first virtual machine with an instance associated with said stub class; and
   b) instantiating said delegator stub class based on the interface descriptor and the object handle and providing the first virtual machine with an instance associated with said delegator stub class.

15. The method for enabling a target computer to represent in a first virtual machine a remote object implemented in a second virtual machine by employing a stub class of claim 13, wherein said interface specific stub includes code to implement all the member function in said member function list.

16. The method for enabling a target computer to represent in a first virtual machine a remote object implemented in a second virtual machine by employing a stub class of claim 15, wherein said delegator stub class includes code that delegates to said implementation code of said interface specific stub.

17. A computer software product that includes a medium readable by a processor, said medium having stored thereon:
   a) a first sequence of instructions which, when executed by said processor, causes said processor to receive an object reference to said remote object from said second virtual machine, said object reference having information associated with said remote object, said information including an interface descriptor and an object handle of said remote object, said object handle for identifying said remote object, said interface descriptor identifying an interface of said remote object implemented in the second virtual machine;
   b) a second sequence of instructions which, when executed by said processor, causes said processor to transform at run-time said information associated with the remote object into a stub class, said stub class representing said remote object and implementing only those interfaces identified by said interface descriptor and defined by the first virtual machine; and
   c) a third sequence of instructions which, when executed by said processor, causes said processor to instantiate said stub class and to provide the first virtual machine with an instance associated with said stub class, said instance including said interface descriptor and said object handle.

18. The computer software product of claim 17, wherein the second sequence of instructions which, when executed by said processor, causes said processor to transform at run-time said information associated with the remote object into a stub class, further includes:
   a) a fourth sequence of instructions which, when executed by said processor, causes said processor to compare said list of interfaces with interfaces defined by the first virtual machine;
   b) a fifth sequence of instructions which, when executed by said processor, causes said processor to generate a common interface list, said common interface list including those interfaces defined by the first virtual machine and identified by said interface descriptor; and
   c) a sixth sequence of instructions which, when executed by said processor, causes said processor to generate said stub class based on said common interface list.

19. The computer software product of claim 18, wherein the sixth sequence of instructions which, when executed by said processor, causes said processor to generate said stub class based on said common interface list, further includes:
   a) a seventh sequence of instructions which, when executed by said processor, causes said processor to generate a member function list, said member function list including the member functions defined by the common interfaces;

b) an eighth sequence of instructions which, when executed by said processor, causes said processor, for each member function in said member function list, to generate a first sequence of code for marshaling the argument into a marshal buffer, a second sequence of code for invoking a corresponding member function on the remote object, a third sequence of code for unmarshaling one of a return value or exception, and a fourth sequence of code for returning one of said return value or said exception; and c) a ninth sequence of instructions which, when executed by said processor, causes said processor to generate said stub class at run-time, said stub class based on the common list of interfaces and the member function list, said stub class including code to implement the member function of said member function list.

20. The computer software product of claim 17, wherein said interface descriptor is a list of interfaces.

21. The computer software product of claim 18, wherein the sixth sequence of instructions which, when executed by said processor, causes said processor to generate said stub class based on said common interface list, further includes:

a) a tenth sequence of instructions which, when executed by said processor, causes said processor to generate a member function list, said member function list including the member function defined by the common interfaces;

b) an eleventh sequence of instructions which, when executed by said processor, causes said processor to generate at least one interface specific stub class at compile time based on the common interface list, the member function list and the object handle associated with the remote object; and c) a twelfth sequence of instructions which, when executed by said processor, causes said processor to generate a delegator stub class at run-time based on the common list interfaces and the member function list, said delegator stub class delegating to said interface specific stub.

22. The computer software product of claim 21, further comprising:

a) a thirteenth sequence of instructions which, when executed by said processor, causes said processor to instantiate said interface specific stub class based on the interface descriptor and the object handle and providing the first virtual machine with an instance associated with said stub class; and b) a fourteenth sequence of instructions which, when executed by said processor, causes said processor to instantiate said delegator stub class based on the interface descriptor and the object handle and providing the first virtual machine with an instance associated with said delegator stub class.

23. A computer system comprising:

a) a processor;

b) a memory, operatively coupled to said processor; and c) a remote object reference mechanism, operatively coupled to said processor and memory, said remote object reference mechanism including:

a first module, configured to receive an object reference to a remote object, said object reference having information associated with said remote object, said information including an interface descriptor and an object handle of said remote object, said object handle identifying said remote object, said interface descriptor identifying an interface of said remote object;

a second module, operatively coupled to said first module, which when executed by said processor, causes said processor to transform at run-time said information associated with the remote object into a stub class, said stub class representing said remote object and implementing only those interfaces identified by said interface descriptor and defined by the first virtual machine; and a third module, operatively coupled to said second module, which when executed by said processor, causes said processor to instantiate said stub class and to provide the first virtual machine with an instance associated with said stub class, said instance including said interface descriptor and said object handle.

24. The computer system of claim 23, wherein the remote object reference mechanism further includes:

a) a fourth module, operatively coupled to said third module which, when executed by said processor, causes said processor to compare said list of interfaces with interfaces defined by the first virtual machine;

b) a fifth module, operatively coupled to said fourth module which, when executed by said processor, causes said processor to generate a common interface list, said common interface list including those interfaces defined by the first virtual machine and identified by said interface descriptor; and c) a sixth module, operatively coupled to said fifth module which, when executed by said processor, causes said processor to generate said stub class based on said common interface list.

25. The computer system of claim 23, wherein the remote object reference mechanism further includes:

a) a seventh module, operatively coupled to said sixth module which, when executed by said processor, causes said processor to generate a member function list, said member function list including the member functions defined by the common interfaces;

b) an eighth module, operatively coupled to said seventh module which, when executed by said processor, causes said processor, for each member function in said member function list, to generate a first sequence of code for marshaling the argument into a marshal buffer, a second sequence of code for invoking a corresponding member function on the remote object, a third sequence of code for unmarshaling one of a return value or exception, and a fourth sequence of code for returning one of said return value or said exception; and c) a ninth module, operatively coupled to said eighth module which, when executed by said processor, causes said processor to generate said stub class at run-time, said stub class based on the common list of interfaces and the member function list, said stub class including code to implement the member function of said member function list.

26. The computer system of claim 23, wherein said interface descriptor is a list of interfaces.

27. The computer system of claim 23, wherein the remote object reference mechanism further includes:

a) a tenth module, operatively coupled to said ninth module which, when executed by said processor, causes said processor to generate a member function list, said member function list including the member function defined by the common interfaces;

b) an eleventh module, operatively coupled to said tenth module which, when executed by said processor, causes said processor to generate at least one interface specific stub class at compile time based on the common interface list, the member function list and the object handle associated with the remote object; and c) a twelfth module, operatively coupled to said eleventh module which, when executed by said processor, causes said processor to generate a delegator stub class at run-time based on the common list interfaces and the member function list, said delegator stub class delegating to said interface specific stub.

28. The computer system of claim 23, further comprising:

a) a thirteenth module, operatively coupled to said twelfth module which, when executed by said processor, causes said processor to instantiate said interface specific stub class based on the interface descriptor and the object handle and providing the first virtual machine with an instance associated with said stub class; and b) a fourteenth module, operatively coupled to said thirteenth module which, when executed by said processor, causes said processor to instantiate said delegator stub class based on the interface descriptor and the object handle and providing the first virtual machine with an instance associated with said delegator stub class.

* * * * *